(12) United States Patent
Kumar et al.

(10) Patent No.: US 8,110,835 B2
(45) Date of Patent: Feb. 7, 2012

(54) SWITCHING DEVICE INTEGRATED WITH LIGHT EMITTING DEVICE

(75) Inventors: Rashmi Kumar, Billerica, MA (US); Robert F. Karlicek, Chelmsford, MA (US)

(73) Assignee: Luminus Devices, Inc., Billerica, MA (US)

( * ) Notice: Subject to any disclaimer, the term of this patent is extended or adjusted under 35 U.S.C. 154(b) by 685 days.

(21) Appl. No.: 11/788,347

(22) Filed: Apr. 19, 2007

(65) Prior Publication Data
US 2008/0258695 A1 Oct. 23, 2008

(51) Int. Cl.
*H01L 27/15* (2006.01)
*G05F 3/16* (2006.01)

(52) U.S. Cl. ....... 257/79; 257/93; 257/99; 257/E25.019; 257/E25.02; 257/E25.028; 323/223; 362/249.05; 362/800

(58) Field of Classification Search ............ 257/93, 257/99, E25.019, E25.02, E25.028, E33.053, 257/79; 323/223; 362/249.05, 800
See application file for complete search history.

(56) References Cited

U.S. PATENT DOCUMENTS

| | | | | |
|---|---|---|---|---|
| 4,259,680 | A * | 3/1981 | Lepselter et al. | 257/559 |
| 4,719,405 | A * | 1/1988 | Boucher | 323/352 |
| 4,777,516 | A * | 10/1988 | Deschler et al. | 257/93 |
| 5,414,616 | A | 5/1995 | Hatozaki | |
| 5,814,841 | A * | 9/1998 | Kusuda et al. | 257/113 |
| 5,866,925 | A | 2/1999 | Zolper et al. | |
| 6,005,649 | A * | 12/1999 | Krusius et al. | 349/73 |
| 6,501,167 | B2 | 12/2002 | Hanamura | |
| 6,587,490 | B2 | 7/2003 | Crawford | |
| 6,593,597 | B2 | 7/2003 | Sheu | |
| 6,697,402 | B2 * | 2/2004 | Crawford | 372/38.03 |
| 6,924,744 | B2 | 8/2005 | Bohlander et al. | |
| 6,933,707 | B2 | 8/2005 | Allen | |
| 7,038,253 | B2 | 5/2006 | Yoshida et al. | |
| 7,075,252 | B1 | 7/2006 | Blackwood | |
| 7,170,100 | B2 | 1/2007 | Erchak et al. | |
| 2003/0013241 | A1 * | 1/2003 | Rockwell et al. | 438/197 |
| 2003/0117348 | A1 * | 6/2003 | Knapp et al. | 345/76 |
| 2004/0188696 | A1 * | 9/2004 | Hsing Chen et al. | 257/99 |
| 2005/0185428 | A1 | 8/2005 | Crawford et al. | |
| 2006/0060878 | A1 * | 3/2006 | Kim et al. | 257/99 |
| 2006/0092639 | A1 | 5/2006 | Livesay et al. | |
| 2007/0069663 | A1 * | 3/2007 | Burdalski et al. | 315/312 |
| 2007/0246736 | A1 * | 10/2007 | Senda et al. | 257/103 |
| 2008/0290819 | A1 * | 11/2008 | Hoepfner et al. | 315/306 |

OTHER PUBLICATIONS

A. Dodabalapur, et al., "Organic smart pixels," *Applied Physics Letters*, vol. 73, No. 2, pp. 142-144, Jul. 13, 1998.
"Building a TinyFlashLED," *Atmel Applications Journal*, Issue 5, Summer 2005, pp. 41-43.

* cited by examiner

*Primary Examiner* — Tom Thomas
*Assistant Examiner* — Benjamin Tzu-Hung Liu
(74) *Attorney, Agent, or Firm* — Wolf, Greenfield & Sacks, P.C.

(57) ABSTRACT

A light emitting component can include a substrate, a light emitting device supported by the substrate, wherein the light-emitting device has first and second terminals, and a switching element supported by the substrate and having first and second terminals electrically connected to the first and second terminals of the light-emitting device, respectively. The switching element is configured to, at least in part, divert at least some current away from the light emitting device when the switching element is in a closed state. An electrical connection between the first terminal of the switching element and the first terminal of the light emitting device can have a length of less than 5 cm (e.g., less than 2 cm, less than 1 cm, less than 5 mm, less than 1 mm). A current regulator may be supported by a second substrate and can supply current to the light emitting device.

41 Claims, 17 Drawing Sheets

SWITCHING DEVICE INTEGRATED WITH LIGHT EMITTING DEVICE

FIELD

The present embodiments are drawn generally towards light emitting devices, components, and/or systems, and more specifically to light emitting devices, components and/or systems including control devices. Specifically, the methods and systems of at least some of the embodiments include control devices for high-brightness light emitting devices, such as light emitting diodes.

BACKGROUND

A light-emitting diode (LED) can provide light in a more efficient manner than an incandescent light source and/or a fluorescent light source. The relatively high power efficiency associated with LEDs has created an interest in using LEDs to displace conventional light sources in a variety of lighting applications. For example, in some instances LEDs are being used as traffic lights and to illuminate cell phone keypads and displays.

Typically, an LED is formed of multiple layers, with at least some of the layers being formed of different materials. In general, the materials and thicknesses selected for the layers influence the wavelength(s) of light emitted by the LED. In addition, the chemical composition of the layers can be selected to promote isolation of injected electrical charge carriers into regions (commonly including quantum wells) for relatively efficient conversion to light. Generally, the layers on one side of the junction where a quantum well is grown are doped with donor atoms that result in high electron concentration (such layers are commonly referred to as n-type layers), and the layers on the opposite side are doped with acceptor atoms that result in a relatively high hole concentration (such layers are commonly referred to as p-type layers).

LEDs also generally include contact structures (also referred to as electrical contact structures or electrodes), which are conductive features of the device that may be electrically connected to an electrical driver circuit. The driver can provide electrical current to the device via the contact structures, e.g., the contact structures can deliver current along the lengths of structures to the surface of the device within which light may be generated.

SUMMARY

Light emitting components and methods associated therewith are provided.

In one aspect, a light emitting component comprises a substrate, a light emitting device supported by the substrate, wherein the light-emitting device has first and second terminals, and a switching element supported by the substrate and having first and second terminals electrically connected to the first and second terminals of the light-emitting device, respectively, and wherein the switching element is configured to, at least in part, divert at least some current away from the light emitting device when the switching element is in a closed state.

In one aspect, a component comprising a light emitting device having first and second terminals, and a switching element having first and second terminals, wherein the first terminal of the switching element is electrically connected by a first electrical connection to the first terminal of the light emitting device, wherein the switching element is configured to divert at least some current away from the light emitting device when the switching element is in a closed state, and wherein the first electrical connection has a length of less than 5 cm.

In one aspect, an assembly comprises a first substrate, a light emitting device supported by the first substrate, wherein the light emitting device has first and second terminals, a switching element supported by the first substrate and having first and second terminals electrically connected to the first and second terminals of the light emitting device, respectively, and wherein the switching element is configured to, at least in part, divert at least some current away from the light emitting device when the shunt switch is in a closed state, a second substrate separate from the first substrate, and at least a portion of a current regulator supported by the second substrate and configured to supply current to the light emitting device.

Other aspects, embodiments and features of the invention will become apparent from the following detailed description of the invention when considered in conjunction with the accompanying figures. The accompanying figures are schematic and are not intended to be drawn to scale. In the figures, each identical or substantially similar component that is illustrated in various figures is represented by a single numeral or notation.

For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Figure 1:
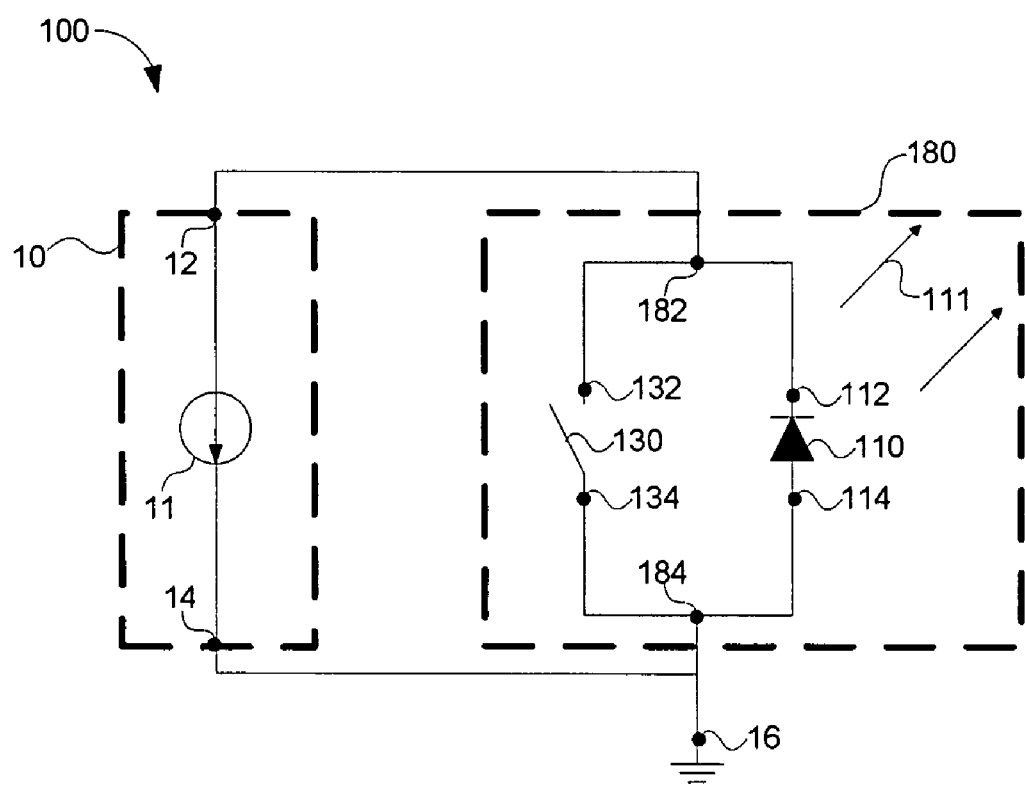
FIG. 1 is a schematic of circuit including a switching element electrically connected in parallel with an LED, in accordance with one embodiment.

The light output of an LED can be varied based on the electrical current provided to the LED. A regulated current may be provided to facilitate the control of the light output of the LED, and a driver circuit may be used to provide current to the LED. The driver circuit may include a current source, which may in turn comprise a current regulator that can output a desired current. The driver circuit may include one or more switches that can be switched so as to turn on and off the LED light emission by controlling the current supplied to the LED. The switches may include transistors, such as field-effect transistors or bipolar transistors.

In conventional systems incorporating low-power LEDs, the driver circuit may be separate from the LED or the LED may be integrated with the driver circuit on a printed circuit board. The inventors have appreciated that integration of some driver circuit elements with the LED, while keeping some driver circuit elements on a separate assembly, may provide significant benefits, especially for high-power LEDs. Such a realization arises in part out of the desire to reduce the form factor of large-area LED die packages to facilitate the incorporation of the LED package into optical sub-systems and system, such as LCD backlighting units (BLUs) (e.g., LED edge-lit BLUs and/or LED back-lit BLUs) and microdisplay systems (e.g., digital micro-mirror display systems, liquid crystal on silicon display systems).

The inventors have appreciated that integration of some driver circuit elements with the LED package can facilitate the high current (e.g., greater than about 1 A, greater than about 5 A, greater than about 10 A, greater than about 20 A) and/or short rise/fall time (e.g., less than about 1 µs, less than about 500 ns, less than about 300 ns, less than about 200 ns, less than about 100 ns, less than about 50 ns) operation of the LED. For instance, if a driver circuit for a high-brightness LED configured to be operated at high current is completely located on a circuit board assembly separate the LED package, then, although the LED package may have a small form factor that can accommodate assembly into optical sub-systems and systems, any electrical wire connections between the driver circuit and the LED that carry high current pulsed signals may lead to operation difficulties. One potential difficulty realized by the inventors is that the electrical wire connection carrying a high current pulsed signal with short rise/fall times may operate as an antenna and may broadcast RF signals.

Another potential difficulty is that the electrical connection carrying a high current pulsed signal may possess a large inductance that may result in large rise/fall times for current carried by the electrical connection, thereby inhibiting the fast switching of the LED. Short rise/fall times of current in LEDs may be desirable to improve performance of a system incorporating the LEDs. For example, short rise/fall times can facilitate the reduction of output wavelength shift due to varying current density and/or enable very low duty cycles for pulsed switching of LEDs (e.g., to improve a dimming scale of the LED). Wavelength shifts effects (e.g., light output peak wavelength shifts of greater than about 5 nm, greater than about 10 nm) may be significant for large current densities (e.g., greater than about 0.5 A/mm$^2$, greater than about 1/mm$^2$, greater than about 1.5 A/mm$^2$). Wavelength shifts due to varying current may result in difficulties in precisely controlling a desired color output of mixed color outputs from LEDs emitting different emission spectra (e.g., different peak wavelengths). For example, wavelength shift versus current may vary the resulting light color of mixed color primaries (e.g., from a red LED, green LED, and blue LED, which may be part of a combined light emitting component). Such variations may be especially problematic when LEDs are switched rapidly, for example, using pulse-width modulation or frequency-modulation control of LEDs, so that the LEDs spend a significant portion (e.g., greater than about 10%, greater than about 25%, greater than about 50%, greater than about 75%) of their on-state time experiencing rising and falling current. In such applications, fast rise/fall times may facilitate precise color control of mixed emitted light.

The inventors have appreciated that the above-mentioned difficulties may be, in part or in whole, alleviated by integrating a switching element with an LED package. In some embodiments, a switching element is a shunt switching element connected in parallel to the LED. In some embodiments, part or all of a current regulator that can provide current to the LED is separate from the LED package that can include the switching element.

By situating a switching element in close proximity (e.g., less than about 5 cm apart, less than about 1 cm apart, less about 5 mm apart, less than about 1 mm apart, less than about 0.5 mm apart) to the LED, for example via integration on the LED package or on a common die (e.g., monolithic integration), a substantially constant current may be provided to the LED package. The operation of the integrated switching element (e.g., placing the switching element in a closed or open state) may then be used set the current provided to the LED. In some embodiments, the switching element is electrically connected in parallel with an LED and can serve as a current shunt to divert current away from the LED when the current switching element is closed (e.g., acting as a short circuit).

FIG. 1 illustrates a schematic of circuit 100 where a switching element is electrically connected in parallel with an LED, in accordance with one embodiment. Circuit 100 may include an LED 110 that may be driven by a current so as to generate emitted light 111. LED 110 may have an anode terminal 114 and a cathode terminal 112. In some embodiments, as illustrated in the schematic of FIG. 1, the anode terminal 114 may be electrically connected to an electrical ground 16. However, it should be appreciated that some or all of techniques presented herein may be used for systems where the cathode of the LED is electrically connected to ground.

To control the current flowing through the LED, and hence the light emission, LED 110 may be electrically connected in parallel with a switching element 130. Switching element 130 can be an electronic switch that can serve as an effective open circuit in a first state (e.g., open state) and an effective short circuit path in a second state (e.g., closed state). Switching element 130 may have a control terminal that allows for a signal (e.g., voltage or current) to be applied that sets whether switching element 130 is open or closed. Switching element 130 may have a first terminal 132 and a second terminal 134, and current can flow between these terminals when the switching element is closed. In this manner, current (e.g., at least some of the current, or substantially all of the current) may be diverted away from the LED 110 circuit path.

In some embodiments, switching element 130 is a transistor. Switching element 130 may include a field-effect transistor (FET) and/or a bipolar junction transistor (BJT). In some embodiments, the switching element may include a power field-effect transistor capable of handling high currents and may have a low drain to source on-resistance (e.g., less than about 5 mOhms). In some embodiments, the switching element may include an insulated gate bipolar transistor (IGBT). In some embodiments, the switching element may include a vertical transistor (e.g., FET, IGBT) where a backside of a semiconductor die may serve as a drain (or source) (or collector/emitter in the case of a IGBT) and a top surface of the semiconductor die may serve as source (or drain) (or emitter/collector in the case of a IGBT). In some embodiments, the switching element may be a silicon transistor, including but not limited to a silicon metal-oxide-semiconductor FET (MOSFET).

To achieve a parallel electrical connection between switching element 130 and LED 110, switching element terminal 132 may be electrically connected to terminal 112 of the LED 110, and switching element terminal 134 may be electrically connect to terminal 114 of LED 110.

In some embodiments, LED 110 and switching element 130 may be integrated in a common package. A common package may include a substrate 180 that supports both the LED 110 and the switching element 130. LED 110 and switching element 130 may be electrically interconnected with conductive lines (e.g., metal lines) on the package substrate, with wire bonds, with flip-chip bonding, and/or through an electrically conducting base substrate. The substrate may include an electrically insulating layer disposed over an electrically conducting base substrate, and conductive lines may be disposed over (e.g., directly on) the electrically insulating layer. Metal-filled vias extending through the electrically insulating layer may be used to provide for electrical connection to the electrically conducting base substrate.

Circuit 100 can include a current source (or at least a portion of a current source) 11 that can be electrically connected (e.g., through electrically conductive wires) to the common substrate so as to provide current to the LED. In the illustration of FIG. 1, at least a portion of the current source 11 may be part of an assembly 10 (e.g., a circuit board) separate from substrate 180. Assembly 10 may include a substrate (e.g., separate from substrate 180) that can support circuit elements that form at least a portion of the current source 11. In some embodiments, the current source 11 may include a current regulator having an external voltage supply input.

As illustrated for circuit 100, current source 11 may have a first terminal 12 and a second terminal 14. Current generated by current source 11 can flow from terminal 12 to terminal 14. First terminal 12 of the current source 11 may be electrically connected (e.g., via electrical wiring) to a terminal 182 of the common LED/switching element package 180. Terminal 182 may be electrically connected to terminal 132 of the switching element 130 and terminal 112 of the LED 110. Second terminal 14 of the current source 11 may be electrically connected (e.g., via electrical wiring) to a terminal 184 of the substrate 180. Terminal 184 may be electrically connected to terminal 134 of the switching element 130 and terminal 114 of the LED 110. Such an electrical connection arrangement may be used for a configuration where the anode of the LED 110 is electrically grounded.

In other embodiments, other arrangements allow for a configuration where the cathode of the LED 110 is grounded. For example, the current source 11 terminal connections may be reversed and the LED 110 terminal connections may also be reversed so that the cathode terminal of the LED is grounded.

Figure 2:
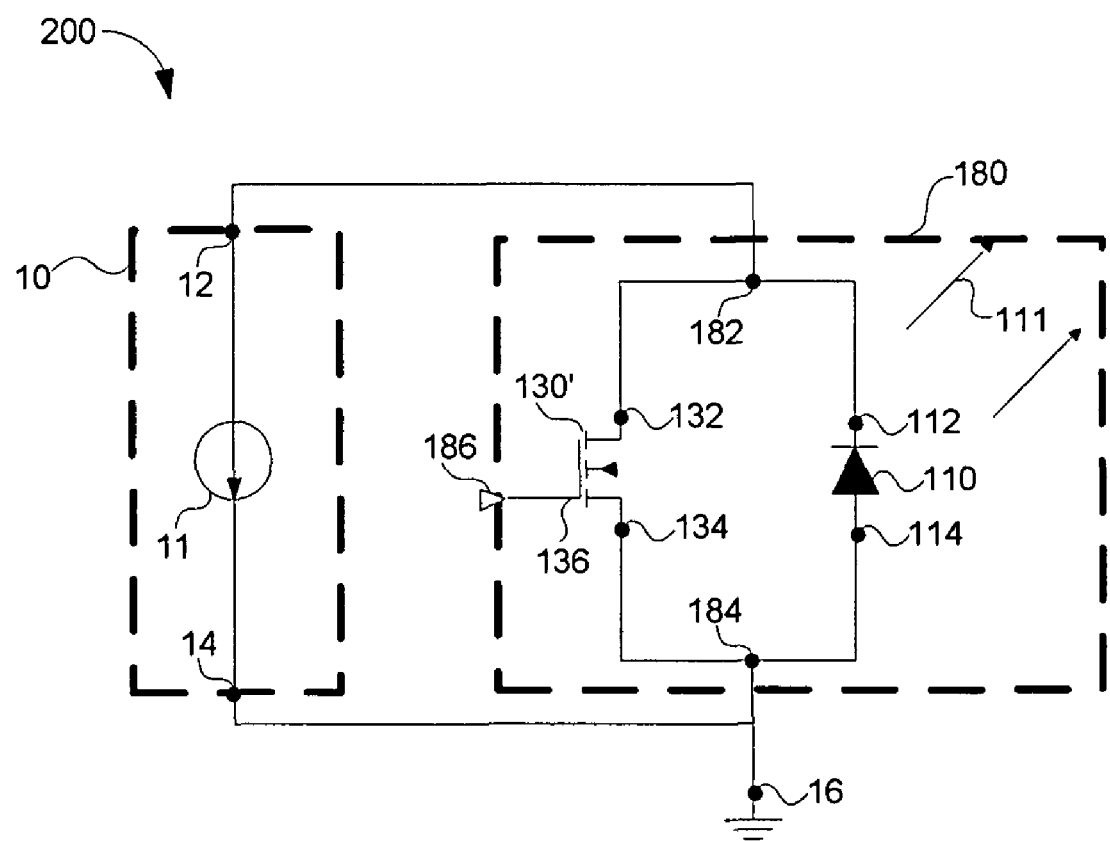
FIG. 2 is a schematic of circuit including a switching element electrically connected in parallel with an LED, in accordance with one embodiment.

FIG. 2 illustrates a schematic of circuit 200 where a FET switching element is electrically connected in parallel with an LED, in accordance with one embodiment. In the context of a FET switching element, the terminals 132 and 134 are referred to as the source and drain terminals. A gate terminal 136 of FET 130' may be electrically connected to an input control terminal 186 of the substrate 180. FET switching element 130' may be a power FET, such as a vertical diffused MOSFET (DMOS). The FET switching element 130' may be an n-type or p-type FET, and may be an enhancement mode or depletion mode device. In some embodiments, the switching element may include two or more FETs, for example, the switching element may include an n-type and a p-type FET configured to form an analog switch.

In embodiments where FET switching element 130' is an enhancement mode device, the FET is in an off state (e.g., acts as an open circuit) when no voltage is applied to a gate terminal 136 of the FET, and no current can flow between terminals 132 and 134 of the FET. In such a state, current flows though the LED 110. When a voltage greater than a threshold voltage is applied to the gate terminal 136, the enhancement mode FET can be switched to an open state (e.g., acts as a short circuit) and current can flow between terminals 132 and 134 of the FET. In such a state, current does not flow through the LED 110.

In embodiments where the FET switching element 130' is a depletion mode device, the FET is in an on state (e.g., acts as a closed circuit) when no voltage is applied to a gate terminal 136 of the FET, and current can flow between terminals 132 and 134 of the FET. In such a state, current does not flow through the LED 110. When a voltage greater than a threshold voltage is applied to the gate terminal 136, a depletion mode FET can be switched to a closed state (e.g., acts as an open circuit) and no current can flow between terminals 132 and 134 of the FET. In such a state, current flows through LED 110.

Since the FET switching element can act as an effective short circuit when in a closed state, the parallel electrical connection of the FET switching with LED 110 allows for the diverting of current (e.g., at least some current or substantially all the current provided by the current source 11) away from the LED 110 circuit path when FET 130' is in a closed state. When FET 130' is in an open state, the FET 130' circuit path is an open circuit, and current provided by the current source 11 passes through LED 110 and the LED 110 emits light 111.

In some embodiments, a switching element having fast switching times (e.g., small rise and fall times) is connected in parallel with an LED. In some embodiments, the switching element may have fast switching times (e.g., rise and/or fall times) of less than about 100 ns (e.g., less than about 75 ns, less than about 50 ns, less than about 25 ns, less than about 10 ns). The rise/fall times of current switching in the LED may be ultimately limited by the switching time (e.g., rise and/or fall time) of the switching element. By reducing the interconnection inductance and/or capacitance (e.g., by reducing the interconnection distance) between the LED and the switching element, the switching time (e.g., rise and/or fall time) for current in the LED may approach the switching time (e.g., rise and/or fall time) of the switching element. In some embodiments, the switching time (e.g., rise and/or fall time) for current in the LED is equal to or less than about 10 times (e.g., less than about 5 times, less than about 3 times, less than about 2 times, about 1 time) the switching time (e.g., rise and/or fall time) of the switching element Although the rise and/or fall times of the switching element may be fast, the switching time for the LED may be larger since the wiring inductance between the switching element and the LED may limit current changes in the circuit. As such, a decrease in the wiring inductance between the switching element and the LED may provide for faster switching (e.g., small rise and fall times) of the current flowing through the LED and hence of the light output of the LED. In the illustrated circuits of FIGS. 1 and 2, the interconnection inductance between the LED 110 and the switching element correspond to the inductance of the electrical interconnections (e.g., electrically conductive path, such as wires, metal traces, metal substrates) between terminal 132 of switching element 130 and terminal 112 of LED 110, and similarly between terminal 134 of the switching element 130 and terminal 114 of the LED 110. A minimization of the interconnection inductance can reduce the rise and fall times associated with switching the LED light output. In some embodiments, the interconnection inductance between the LED and the switching element is less than about 100 nanoHenries (e.g., less than about 50 nanoHenries, less than about 25 nanoHenries, less than about 10 nanoHenries, less than about 5 nanoHenries, less than about 1 nanoHenries).

In some embodiments, a reduced interconnection inductance between an LED and a switching element may be achieved by integrating the LED and the switching element in a common package. The LED and the switching element may be integrated on a common substrate, including but not limited to a common die (e.g., monolithic integration), a common sub-mount, a common sub-package, and/or a common metal-core board.

Figure 3A:
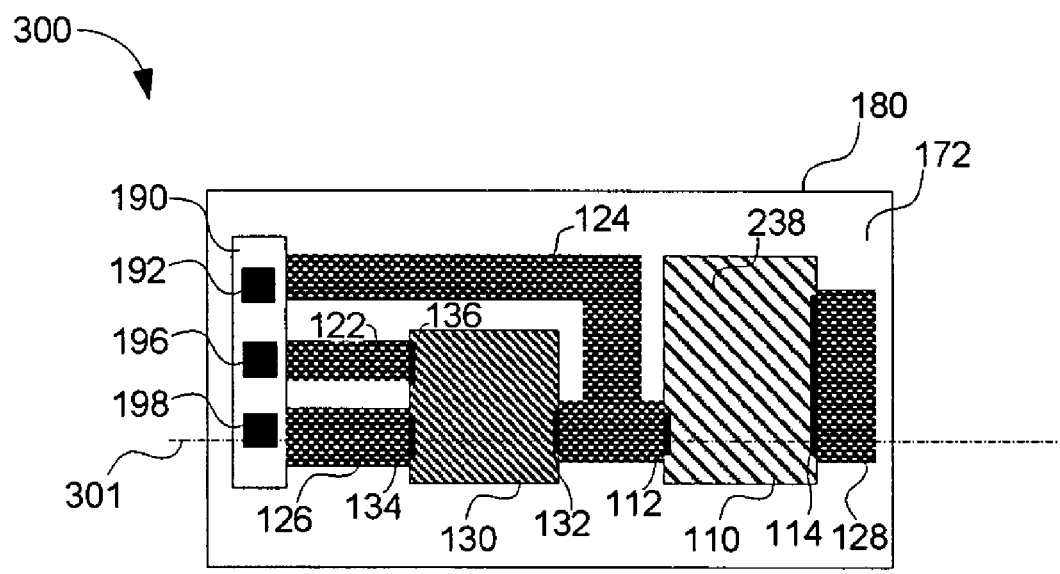
FIG. 3a is a top view schematic of a light emitting component including an LED and a switching element, in accordance with one embodiment.
Figure 3B:
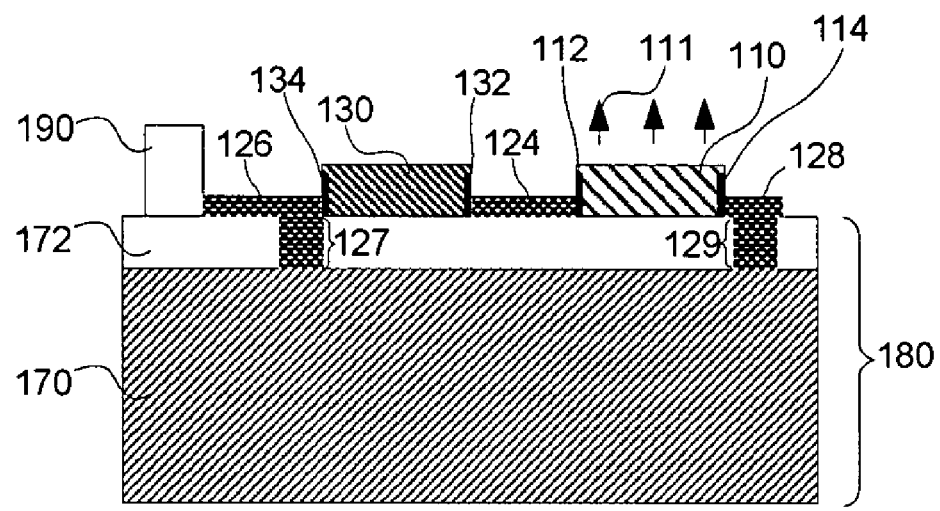
FIG. 3b is a cross-section schematic of the light emitting component of FIG. 3a, in accordance with one embodiment.

FIGS. 3a and 3b illustrate a top view and a side view (along cross-section 301) of an integrated light emitting component 300 including an LED and a switching element. LED 110 may be an LED die, a partially packaged LED die, and/or a fully packaged LED. Switching element 130 may be an electronic switch, such as a transistor (e.g., a FET, BJT, IGBT). Switching element 130 may be a semiconductor transistor device die, a partially packaged semiconductor transistor device die, and/or a fully packaged semiconductor transistor device die.

The LED and/or the switching element may include pins enabling the device(s) to be mounted to a common substrate. Alternatively, or additionally, the LED and/or the switching element may be solder-bump bonded to the common substrate. In some embodiments, a portion or substantially all of the backside surface of LED 110 (e.g., an LED die) and/or switching element 130 (e.g., a switching element die) can serve as electrical terminals. The backside of LED 110 and/or switching element 130 may be electrically connected (e.g., by an electrically conductive material, such as a solder or an electrically conductive die attach material) to conductive lines on the common substrate, to electrically conductive vias, and/or directly to an electrically conductive base substrate.

LED 110 and switching element 130 may be integrated on a common substrate 180. Substrate 180 may include electrically conducting regions and/or electrically insulating regions. Substrate 180 can include an electrically conductive base substrate 170. The electrically conductive base substrate 170 may be formed of one or more electrically conductive materials, such as one or more metals (e.g., copper, gold, aluminum, alloys thereof). Substrate 180 may include an electrically insulating layer 172, such as a dielectric layer (e.g., a ceramic layer, a polymer layer). Electrically insulating layer 172 may be disposed over (e.g., directly on) the electrically conductive base substrate 170. Electrically conductive trace lines (e.g., metal lines, such as copper lines) may be disposed over (e.g., directly on) electrically insulating layer 172 so as to be electrically isolated from the base substrate 170. In some embodiments, substrate 180 can be thermally conductive, and therefore can facilitate the conduction of heat way from LED 110 and/or switching element 130.

In some embodiments, part or all of substrate 180 may be electrically grounded. A grounded base substrate 170 can provide an electrical ground plane for one or more devices supported by substrate at 180. One or more terminals of switching element 130 and/or LED 110 may be grounded to the electrical ground plane provided by base substrate 170, for example, by electrical connection through via(s) (e.g., metal filled vias) that can provide for electrical connection between base substrate 170 and components supported by substrate 180.

LED 110 may include first and second electrical terminals 112 and 114 (e.g., cathode and anodes terminals). As previously mentioned, in some embodiments, a backside of LED 110 may serve as an electrical terminal (e.g., cathode or anode terminal). LED 110 may emit light 111 through an emission surface area 238 (e.g., parallel to the substrate 180). In some embodiments, LED 110 includes a large area LED die or multiple LED dies (e.g., multiple large area dies) arranged substantially proximate each other. Multiple LED dies can be electrically connected in series or parallel, and may emit the same peak wavelengths of light or some or all of the LED dies may emit different peak wavelengths of light. LED 110 may have an emission surface area greater than about 1 mm$^2$ (e.g., greater than about 2 mm$^2$, greater than about 3 mm$^2$, greater than about 5 mm$^2$, greater than about 10 mm$^2$, greater than about 20 mm$^2$).

In some embodiments, at least about 45% (e.g., at least about 50%, at least about 55%, at least about 60%, at least about 70%, at least about 80%, at least about 90%, at least about 95%) of the total amount of light generated by a light-generating region (e.g., active region of the LED) that emerges from LED emerges via an emission surface area of the LED. In some embodiments, the emission area of LED 110 can be relatively large, while still exhibiting efficient light extraction from LED 110. For example, one or more edges of LED 110 can be at least about 1 mm long (e.g., at least about 1.5 mm long, at least about 2 mm long, at least about 2.5 mm long, at least about 3 mm long, at least about 5 mm long), and at least about 45% (e.g., at least about 50%, at least about 55%, at least about 60%, at least about 70%, at least about 80%, at least about 90%, at least about 95%) of the total amount of light generated by a light generating region (e.g., active region of the LED) that emerges from LED 110 emerges via emission surface area 238. This can allow for an LED to have a relatively large emission surface area (e.g., at least about 1 mm by at least about 1 mm) while exhibiting good power conversion efficiency. In some embodiments, the extraction efficiency of an LED 110 is substantially independent of the length of the edge of the LED. As referred to herein, the extraction efficiency of an LED is the ratio of the light emitted by the LED to the amount of light generated by the device (which can be measured in terms of energy or photons). This can allow for an LED to have a relatively large emission surface area (e.g., at least about 1 mm by at least about 1 mm) while exhibiting good power conversion efficiency.

A large emission surface area of LED 110 allows for high light output from LED 110. To achieve a high light output from a large area LED, a high electrical current (e.g., greater than 1 Amps, greater than 2 Amps, greater than 5 Amps, greater than 10 Amps, greater than 20 Amps) can be provided to the LED 110 via the cathode and/or anode terminals of the LED 110. In some instances, it may be desirable to have short rise/fall time (e.g., less than 1 µs, less than 500 ns, less than 300 ns, less than 200 ns, less than 100 ns, less than 50 ns) operation of the LED. In some embodiments, to enable such fast rise/fall times in conjunction with large electrical currents provided to the LED, a switching element that can control current flowing through the LED can be integrated with the LED package (e.g., in a common package, such as on a common substrate).

As illustrated in FIGS. 3a-b, switching element 130 may include a control terminal 136 (e.g., a gate terminal of a FET) and first and second terminals 132 and 134 (e.g., source and drain terminals of a FET). The terminals of the switching element may include electrical pins (e.g., in the case of a packaged switching element), wire bonds, solder bumps, and//or backside contacts.

In some embodiments, the maximum current carrying capability of switching element 130 may be related to (e.g., approximately proportional to) the area (e.g., top view area shown in FIG. 3a) of switching element 130. When switching element 130 includes a vertical transistor device, such as a vertical FET or IGBT, the maximum current that the transistor can conduct may be proportional to the die area of the transistor. To enable high currents flowing through a large area LED to be diverted through the switching element, the switching element may have a corresponding large area.

In some embodiments, switching element 130 occupies an area on substrate 180 that is smaller than an area occupied by LED 110. LED 110 can occupy an area on substrate 180 that is greater than about 2 times (e.g., greater than about 3 times, greater than about 4 times, greater than about 6 times) the area occupied by switching element 130. In some embodiments, switching element 130 occupies an area on substrate 180 that is substantially similar to or greater than an area occupied by LED 110. Switching element 130 can occupy an area on substrate 180 that is greater than about 2 times (e.g., greater than about 3 times, greater than about 4 times, greater than about 6 times) the area occupied by the LED 110. In some embodiments, a length of at least one side of the LED 110 and a length of at least one side of the switching element 130 are substantially similar. Such a configuration can allow for the sides of LED 110 and switching element 130 having similar lengths to be placed adjacent each other on the substrate, thereby allowing for a compact form factor of the light emitting component.

In some embodiments, LED 110 and switching element 130 are disposed over a substantial portion of the substrate 180. LED 110 and switching element 130 can be disposed over greater than about 10% (e.g., greater than about 25%, greater than about 50%, greater than about 75%, greater than about 90%) of the substrate 180 area. Configurations where the LED and the switching element are disposed over a substantial portion of the substrate 180 can allow for a compact form factor for the light emitting component. In some embodiments, one or more electrical and/or opto-electronic component(s), such as resistors, capacitors, inductors, thyristors, diodes, transistors, external connectors, temperature sensors, may be disposed on the substrate 180 in addition to the LED 110 and/or the switching element 130. In such embodiments, the other electrical and/or opto-electronic components can be disposed over less than about 90% (e.g., less than about 75%, less than about 50%, less than about 25%, less than about 10%) of the substrate 180 of the common package.

Connector 190 (e.g., external electrical connector) can be disposed on the surface of the substrate, and can allow for external electrical connection to components on the package. Connector 190 can include male and/or female connector terminals 192, 196, and 198.

Light emitting component 300 can include conductive lines (e.g., metal traces, for example copper traces) 122, 124, 126, and/or 128 that can provide for electrical connections between elements of the integrated light emitting component 300. Conductive lines can provide for electrical connection between electrical terminals of LED 110, switching element 130, and/or connector 190.

It should be appreciated that the interconnection inductance between LED 110 and the switching element 130 can vary about inversely with the width of conductive line 124 and about proportionally with the length of the conductive line that provides for electrical connection between terminal 112 of the LED and terminal 132 of the switching element. Thus, the interconnection inductance between LED 110 and the switching element 130 can be reduced by increasing the width of the conductive line 124 and/or reducing the distance between terminal 132 of the switching element and terminal 112 of the LED. As previously described, reducing the wiring inductance between the LED 110 and the switching element 130 can facilitate the operation of the LED 110 with short rise/fall times and/or large current. Although the wiring inductance can be reduced by the methods described above, it should be appreciated that the wiring capacitance may also vary with the dimensions of the wiring interconnection. The interconnection capacitance can vary about proportionally with the width and the length of the conductive line (e.g., a trace metal line disposed over a ground plane, such as a metal-core board). Therefore, reducing the length of the conductive line can reduce both the interconnection inductance and capacitance. Since rise/fall times can decrease with both decreasing inductance and capacitance, a configuration where LED 110 and switching element 130 are in close proximity (e.g., the electrical interconnection length between the LED and switching element is less than about 5 cm apart, less than about 2 cm apart, less than about 1 cm apart, less than about 5 mm apart, less than about 1 mm apart, less than about 0.5 mm apart) can facilitate large current operation with short rise/fall times.

Light emitting component 300 can include vias (e.g., metal-filled vias, such as copper-filled vias and/or aluminum-filled via), such as vias 127 and 129, that can allow for electrical connection between conductive lines (e.g., metal traces) disposed over insulating layer 172 and electrically conductive base substrate 170. In some embodiments, electrical connection to an electrically conducting base substrate 170 may be achieved by backside contacts to elements. For example, a backside contact to the LED 110 and/or switching element 130.

As shown in FIG. 3a, conductive line 122 can provide electrical connection between control terminal 136 (e.g., gate terminal of a FET) and terminal 196 of connector 190. A portion of conductive line 124 can provide electrical connection between terminal 132 of switching element 130 and terminal 112 of LED 110. Conductive line 124 can also provide for electrical connection between the aforementioned terminals (132 and 112) and terminal 192 of connector 190.

At least a portion of conductive line 126 and via 127 can provide for electrical connection between terminal 198 of connector 190 and electrically conductive base substrate 170. At least a portion of conductive line 126 and via 127 can provide for electrical connection between terminal 134 of switching element 130 and electrically conductive base substrate 170. In embodiments where base substrate 170 is an electrically conductive base substrate, conductive line 126 need not provide for a direct electrical connection between terminal 198 and terminal 134, as an electrical connection can be established by an electrical connection through the electrically conductive base substrate 170. For example, terminal 198 of connector 190 may be electrically connected to the electrically conductive base substrate through a first via (e.g., a metal filled via) and terminal 134 of switching element 130 may be electrically connected to the electrically conducive base substrate through a second via (e.g., a metal filled via). Conductive line 128 and via 129 can provide for electrical connection between terminal 114 (e.g., anode or cathode) of the LED 110 and the electrically conductive base substrate 170. In some embodiments, LED 110 can be an LED die having a conductive backside surface (e.g., acting as an anode or cathode terminal), and the backside surface of the LED can be in electrical contact with a metal-filled via that provides for an electrical connection to the base substrate 170.

The illustrated configuration of conductive lines and vias is just one example of an arrangement that allows for switching element 130 to be electrically connected in parallel to LED 110. It should be appreciated that other arrangements to achieve a parallel electrical connection between switching element 130 and LED 110 are possible.

Figure 4:
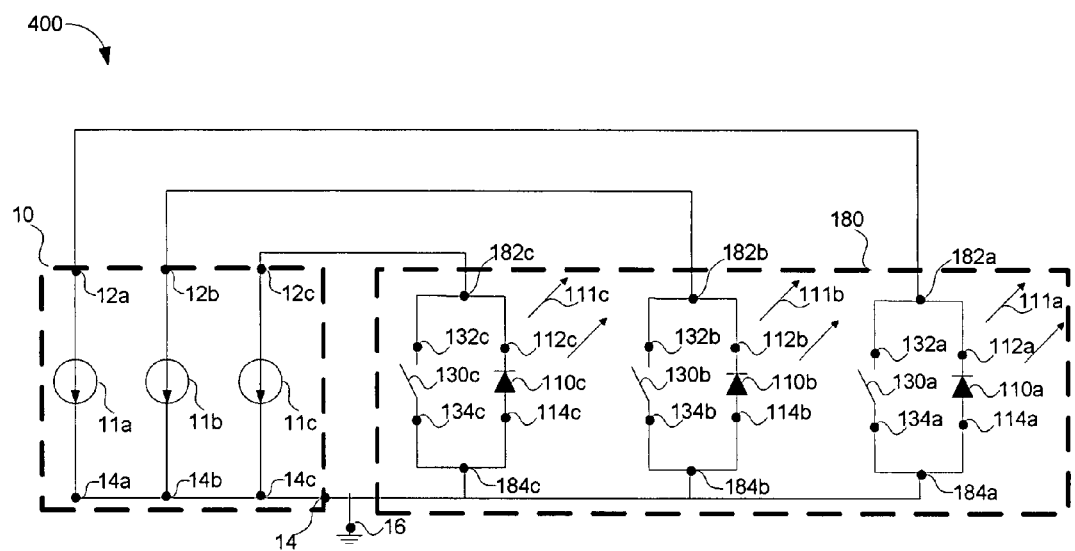
FIG. 4 is a schematic of a circuit including multiple switching elements and multiple LEDs, in accordance with one embodiment.

FIG. 4 illustrates a schematic of a circuit 400 including multiple switching elements, in accordance with one embodiment. Circuit 400 may include multiple LEDs 110a-c and multiple switching elements 130a-c. Switching element 130a-c may be electrically connected in parallel with the LED 110a-c, respectively. Each of the LEDs 110a-c can be electrically connected to current sources 11a-c, respectively, so that each LED is driven by current supplied by a separate current source. Switching elements 130a-c can be switched between a closed state (e.g., short circuit state) and open state (e.g., open circuit state) to divert current from the respective LEDs for which each switching element is electrically connected in parallel with.

LEDs 10a-c can be LEDs that emit light 111a-c having the same or different emission spectra. For example, LED 110a can be an LED that emits light having a peak wavelength corresponding to red light. LED 110b can be an LED that emits light having a peak wavelength corresponding to green light. LED 110c can be an LED that emits light having a peak wavelength corresponding to blue light.

In some embodiments, the plurality of LEDs (e.g., 110a-c) may have anodes connected to the same potential. For example, as illustrated in FIG. 4, LEDs 10a-c can have anode terminals 114a-c electrically connected to an electrical ground 16. In other embodiments, a plurality of LEDs may have cathode terminals electrically connected to the same potential, for example an electrical ground.

LEDs 110a-c and switching elements 130a-c can be integrated in a common package. For example, LEDs 110a-c and switching elements 130a-c may be supported by a substrate 180 of a common package. LEDs 110a-c and switching elements 130a-c may be electrically interconnected with conductive lines (e.g., metal lines) on the package substrate, with wire bonds, with bump bonding, and/or through an electrically conductive base substrate. The substrate may include an electrically insulating layer disposed over the electrically conducting base substrate, and conductive lines (e.g., metal lines) may be disposed over (e.g., directly on) the electrically insulating layer. Metal-filled vias extending through the electrically insulating layer may be used to provide for electrical connection to the electrically conducting base substrate.

In the illustration of FIG. 4, at least a portion of the current sources 11a-c can be part of an assembly 10 (e.g., a circuit board) separate from the substrate 180. Assembly 10 may include a substrate that can support circuit elements that form at least a portion of current sources 11a-c. In some embodiments, current source 11a-c may include one or more current regulators having an external voltage supply input. Current sources 11a-c can have first terminals 12a-c that may be electrically connected (e.g., via electrical wiring) to terminals 182a-c, respectively, of substrate 180. Second terminals 14a-c of current sources 11a-c may be electrically connected to a common terminal 14 which may be in turn be electrically connected (e.g., via electrical wiring) to terminals 184a-c of substrate 180. Terminal 14 can be connected to electrical ground terminal 16.

Terminals 184a-c may be electrically connected to terminals 134a-c of the switching elements 130a-c, respectively, and terminals 114a-c of LED 110a-c, respectively. Such an electrical connection arrangement may be used for a configuration where the anodes of LEDs 110a-c are electrically grounded. In other embodiments, other arrangements allow for a configuration where the cathodes of the LEDs 110a-c are grounded.

Figure 5A:
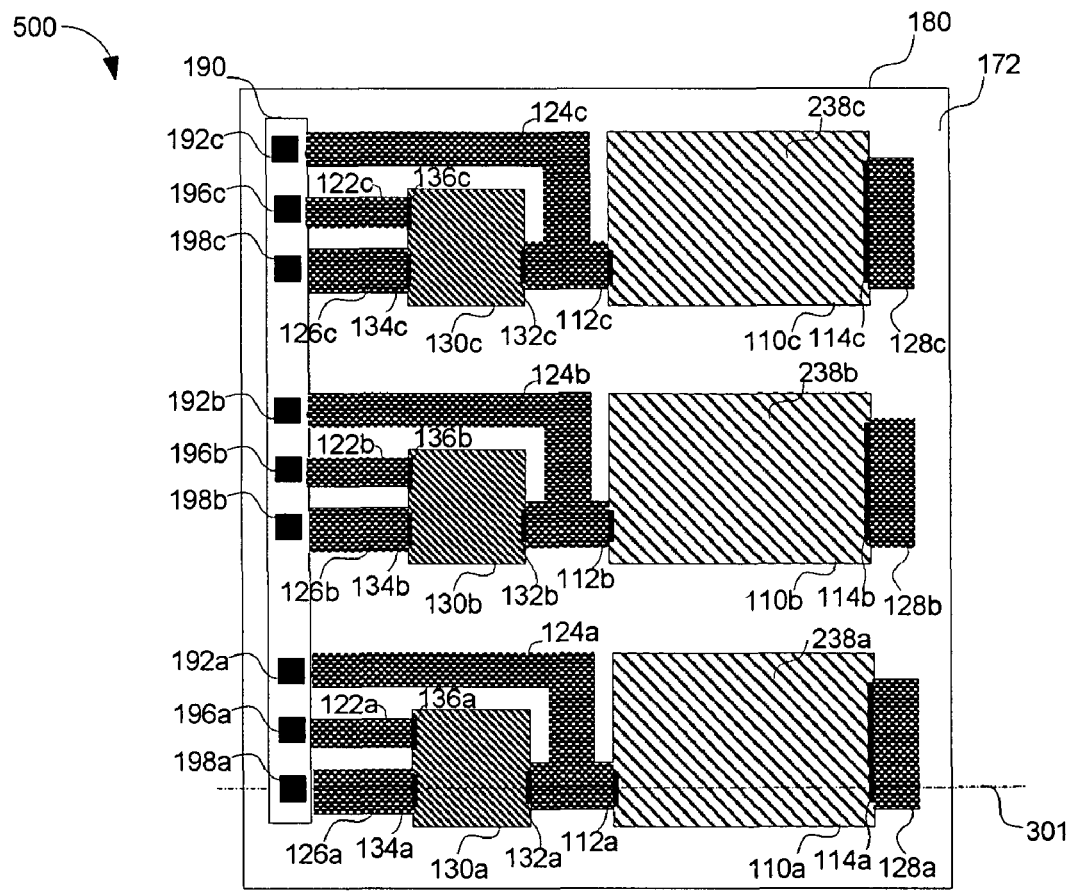
FIG. 5a is a top view schematic of an light emitting component including multiple LEDs and multiple switching elements, in accordance with one embodiment.
Figure 5B:
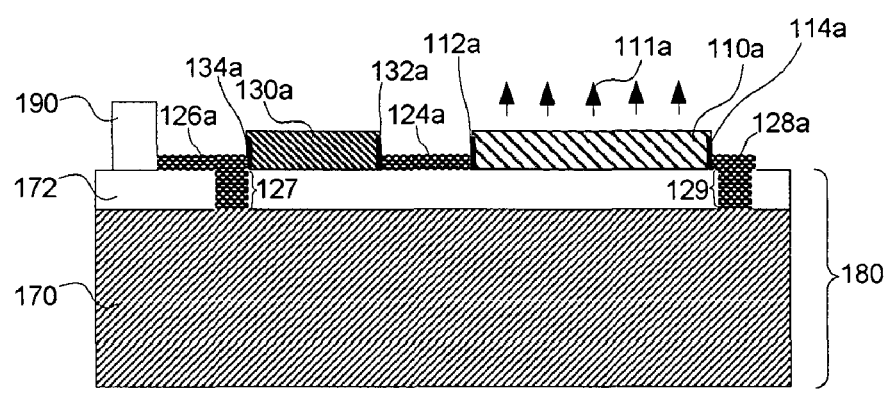
FIG. 5b is a cross-section schematic of the light emitting component of FIG. 5a, in accordance with one embodiment.

FIGS. 5a-b illustrate top view and side view (along cross-section 301) of a light emitting component 500 including multiple LEDs and multiple switching elements. Light emitting component 500 is similar to light emitting component 300 except that multiple LEDs and corresponding switching elements are integrated on a common substrate. LEDs 110a-c may be LED dies, partially packaged LED dies, and/or fully packaged LEDs. LEDs 110a-c may emit similar light spectra (e.g., having similar peak wavelengths) or two or more LEDs may emit different light spectra (e.g., having different peak wavelengths). In some embodiments, LEDs 110a-c can emit light spectra having red, green, and blue peak emission wavelengths, respectively. Switching elements 130a-c may be electronic switches, such as transistors (e.g., a FET, an IGBT). Switching elements 130a-c may be semiconductor transistor device dies, partially packaged semiconductor transistor device dies, and/or fully packaged semiconductor transistor device dies.

LEDs 110a-c and switching element 130a-c may be integrated on a common substrate 180. Substrate 180 can include an electrically conductive base substrate 170. The electrically conductive base substrate 170 may be formed of one or more electrically conductive materials, such as one or more metals (e.g., copper, aluminum, alloys thereof). Substrate 180 may include an electrically insulating layer, such as a dielectric layer (e.g., a ceramic layer, a polymer layer). An electrically insulating layer 172 may be disposed over (e.g., directly on) the electrically conductive base substrate 170. Conductive lines (e.g., metal lines) may be disposed over (e.g., directly on) electrically insulating layer 172 so as to electrically isolated from the base substrate 170. In some embodiments, substrate 180 can be thermally conductive, and therefore can facilitate the conduction of heat generated by LEDs 1110a-c and/or switching elements 130a-c. In some embodiments, part or all of substrate 180 may be electrically grounded. A grounded base substrate 170 can provide an electrical ground plane for one or more devices supported by substrate at 180 (e.g., one or more LEDs and one or more switching elements).

LEDs 110*a-c* may include first and second terminals 112*a-c* and 114*a-c* (e.g., cathode and anode terminals). LEDs 110*a-c* may emit light (e.g., LED 110*a* can emit light 111*a*) through an emission surface area 238*a-c*, respectively (e.g., parallel to the substrate 180). LEDs 110*a-c* may individually have emission surface areas greater than about 1 mm$^2$ (e.g., greater than about 3 mm$^2$, greater than about 5 mm$^2$, greater than about 10 mm$^2$, greater than about 20 mm$^2$).

Large emission surface areas for LEDs 110*a-c* can allow for high light output by the LEDs. To achieve a high light output from large area LEDs, high electrical currents (e.g., greater than 1 Amp, greater than 5 Amps, greater than 10 Amps, greater than 20 Amps) can be provided to the individual LEDs 110*a-c* via the respective cathode and/or anode terminals of the LEDs 110*a-c*.

In some instances, it may be desirable to have short rise/fall time (e.g., less than 1 μs, less than 500 ns, less than 300 ns, less than 200 ns, less than 100 ns, less than 50 ns) operation of one or more LEDs 110*a-c*. In some embodiments, to enable such fast rise/fall times in conjunction with such large electrical currents provided to one or more of the LEDs, one or more switching elements (e.g., a switching element for each LED) that can control current flowing through one or more LEDs can be integrated with the LEDs (e.g., in a common package, such as, on a common substrate). Each LED and corresponding switching element may be in close proximity (e.g., less than about 5 cm apart, less than about 2 cm apart, less than about 1 cm apart, less than about 5 mm apart, less than about 1 mm apart), which can facilitate large current operation with short rise/fall times. It should be appreciated that the distance between each LED and corresponding switching element can be different for each pair of LED and corresponding switching element (e.g., LED 110*a* and switch 130*a*, LED 110*b* and switch 130*b*, LED 110*c* and switch 130*c*.

In some embodiments, LEDs 110*a-c* and switching elements 130*a-c* are disposed over a substantial portion of the substrate 180. LEDs 110*a-c* and switching elements 130*a-c* can be disposed over greater than about 10% (e.g., greater than about 25%, greater than about 50%, greater than about 75%, greater than about 90%) of the substrate 180 of the common package. Configurations where the LEDs and the switching elements are disposed over a substantial portion of the substrate 180 can allow for a compact form factor of the light emitting component that includes the LEDs and integrated current switching elements for each LED.

Figure 6A:
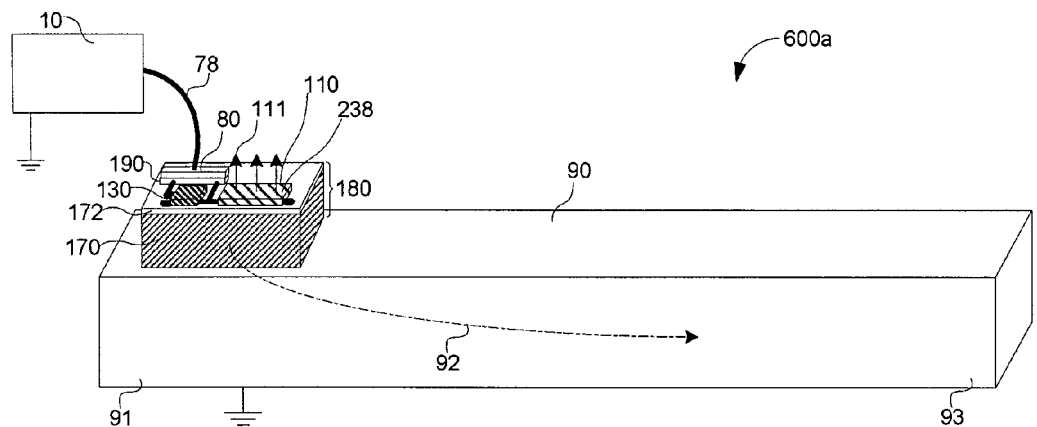
FIG. 6a is a schematic of a light emitting component integrated with a thermal management system, in accordance with one embodiment.

FIG. 6*a* illustrates a system 600*a* including a light emitting component integrated with a thermal management system. System 600*a* can include a light emitting component that may comprise one or more LEDs (e.g., LED 110) and one or more switching elements (e.g., switching element 130) that can control the current supplied to the one or more LEDs. As described in connection with FIGS. 3 and 5, a light emitting component can include one or more LEDs and one or more corresponding switching elements that may be connected in parallel with their corresponding LEDs. The LEDs and the current switching elements may be supported by a substrate 180 that can include an electrically conductive base substrate 170. Substrate 180 can include an electrically insulating layer 172 on which electrically conductive lines (e.g., metal trace lines) can be formed to allow for electrical interconnection between elements supported by substrate 180. The light emitting component can include an external connector 190 that can allow for electrical connections to one or more external components, as described further below.

Electrical connections to external components can allow for current and/or voltage to be supplied to the elements of the light emitting component. For example, current can be supplied to one or more LEDs supported by substrate 180. When switching element 130 is in an open state, the supplied current can flow through the LED, and light 111 can be generated and emitted by the LED via an emission surface 238. In the illustrated embodiment, a substantial portion (e.g., greater than about 50% of the total emitted light, greater than about 75% of the total emitted light) of the emitted light 111 is emitted substantially perpendicular (e.g., within a 30 degree emission cone, within a 45 degree emission cone) to substrate 180. In some embodiments, a substantial portion of the emitted light 111 is emitted at an angle that is not substantially perpendicular to substrate 180.

As previously described, a high current (e.g., greater than 1 Amp, greater than 5 Amps, greater than 10 Amps, greater than 20 Amps) can be provided to the LED(s) described herein. As a result, a corresponding large amount of heat may be generated during the operation of the LED(s) and/or the operation of the current switching element.

To conduct and/or dissipate the heat, the light emitting component can be in thermal contact with a thermal management system 90. In some embodiments, the light emitting component's electrically conductive base substrate 170 is in direct contact (e.g., via an attachment material, such as solder) with at least a portion or all of the thermal management system 90. In such embodiments, the portion of the thermal management system 90 in contact with the electrically conductive base substrate 170 can be electrically grounded (e.g., when the electrically conductive base substrate 170 is electrically grounded).

Thermal management system 90 can include one or more components that can provide for efficient thermal conduction and/or dissipation. In some embodiments, thermal management system 90 can include one or more heat pipes and/or vapor plates. Heat pipes and/or vapor plates can provide for efficient transport of heat 92 from a portion 91 of the heat pipes and/or vapor plates over which the light emitting component is disposed to an opposing portion 93. Thermal management system 90 can include components that provide for efficient dissipation of heat, including portions that have a large surface area (e.g., protrusions, such as fins, for example, aluminum, copper, and/or graphite composite fins). In some embodiments, the LED and switching element may be directly supported by the thermal management system (e.g., heat pipe and/or vapor plate). In such instances, the electrically conductive base 170 may be absent and the thermal management system can serve as an electrically conductive base for one or more LEDs and one or more corresponding switching elements.

Electrical power (e.g., current and/or voltage) can be provided to the light emitting component by a power component 10 that may be electrically connected to the light emitting component via an electrical connection 78 (e.g., wiring, such as a cable). Electrical connection to the light emitting component connector 190 may be provided by a counterpart connector 80. In some embodiments, power component 10 can include a current regulator that provides an electrical current via electrical connection 78. A voltage source can be provided to the current regulator which can generate a regulated electrical current, thus power component 10 can serve as a current source.

In the illustrated embodiments, power component 10 is separate from the light emitting component which allows for a compact assembly for the light emitting component. The light emitting component can include an integrated switching element that provides for the fast switching of large currents supplied to a corresponding LED. Such a configuration allows for a compact form factor for the light emitting component to enable incorporation of the light emitting component in systems and subsystems where space is at a premium but fast switching of the LED is desirable.

Figure 6B:
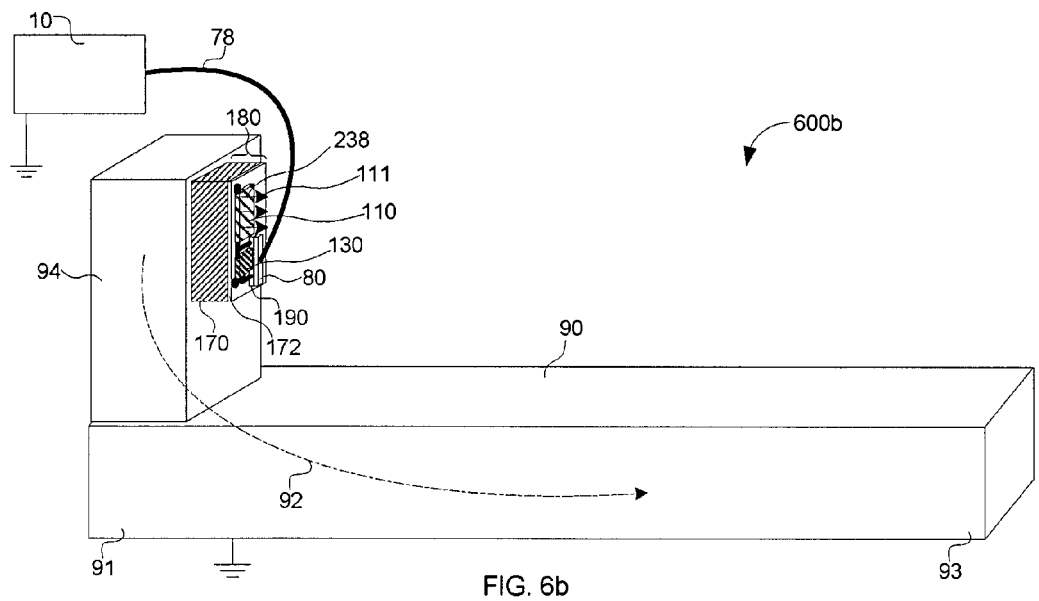
FIG. 6b is a schematic of a light emitting component integrated with a thermal management system, in accordance with one embodiment.

It should be appreciated that the light emitting component may be combined with a thermal management system in other arrangements. For example, FIG. 6b illustrates a system 600b including a light emitting component integrated with a thermal management system such that emitted light is substantially parallel the thermal management system length (e.g., the length between ends 91 and 93). Thermally conductive component 94 may allow for thermal communication between the thermal management system 90 and the light emitting component. Thermally conductive component 94 can also serve as a platform that can support the substrate 180 of the light emitting component. Thermally conductive component 94 can be formed of any suitable thermally conductive material, for example one or more metals (e.g., copper and/or aluminum), graphite and/or a graphite composite. Thermally conductive component 94 can be electrically conductive and can be in electrical contact with the substrate 170. The thermally conductive component 94 can be electrically grounded.

Figure 7:
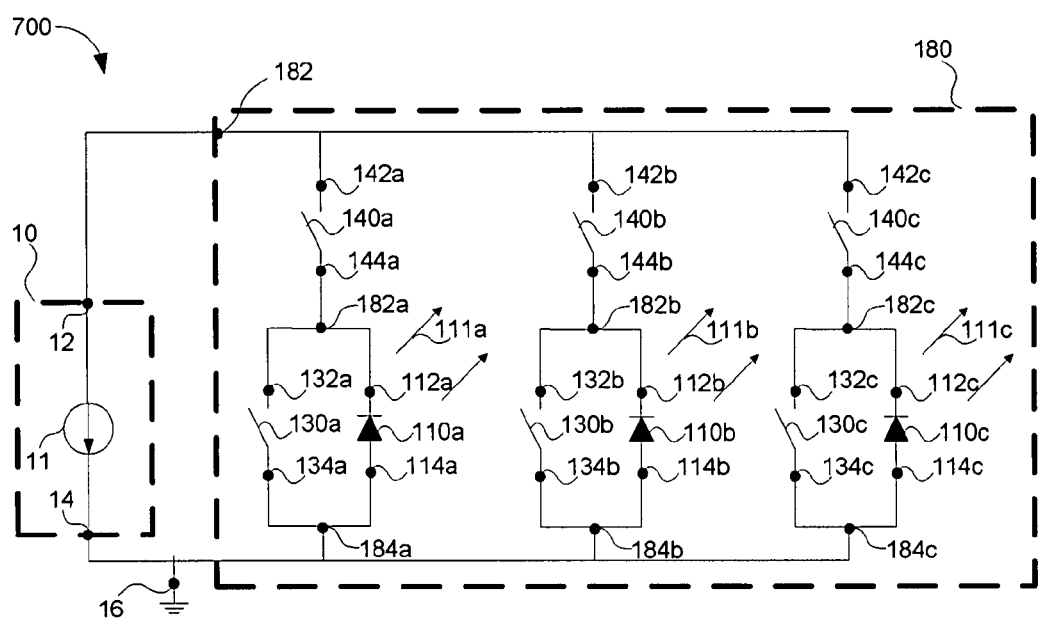
FIG. 7 is a schematic of a circuit including multiple switching elements and multiple LEDs, in accordance with one embodiment.

In some embodiments, a current source (e.g., current regulator) can provide current to a plurality of LEDs. FIG. 7 illustrates a schematic of a circuit 700 that implements an example of such an embodiment. A plurality of LEDs 110a-c can be driven by a current source 11. Switching elements 140a-c can be connected in series with the LEDs 110a-c, respectively, and can be placed in a closed state (e.g., via the application of a signal to a control terminal of the switching elements) to allow current to flow through the LED which the switching element is in series with. In some embodiments, switching elements 130a-c can be connected in parallel with the LEDs 110a-c, respectively. Switching elements 130a-c can be placed in an open state to (e.g., via the application of a signal to a respective control terminal of the switching elements) to allow current to flow through LEDs 110a-c, respectively.

Switching elements 140a-c can allow for a single current source 11 to provide an electrical current that can be multiplexed via control (e.g., controlling whether the switches are in a closed or open state) of switching elements 140a-c so that the current can be provided to LEDs 110a-c during different time intervals. For example, when switching element 140a is set to a closed state and switching elements 140b and 140c are set to open states, current provided by current source 11 can be provided to terminal 182a. Current is provided to LED 110a when switching element 130a is set to an open state, and LED 110a can then generate and emit light 111a. To terminate the generation of light by LED 110a, switching element 130a can be set to a closed state and current can then be diverted away from LED 110a and sent through switching element 130a. Alternatively, or additionally, switching element 140a can be set to an open state. To allow for light emission in the other LEDs 110b and/or 110c, switching elements 140b and/or 140c can be set to their closed states. In this manner, current from current source 11, can be provided to a desired LED (e.g., 110a, 110b, and/or 110c) during a desired time interval. The emission of light from multiple LEDs can be multiplexed so that each LED emits light when the other LEDs are off. Such operation can allow for one current source to provide a desired current to a multiple LEDs, whose operation can be time multiplexed. Systems in which time multiplexed operation of LEDs may be used are described in, for example, U.S. patent application Ser. No. 11/600,548, entitled "LED Color Management and Display Systems," filed on Nov. 16, 2006, which is herein incorporated by reference in its entirety.

In some embodiments, LEDs 110a-c are the same types of LEDs (e.g., same die area and/or same light color emission, for example using the same active region materials). In some embodiments, two or more LEDs are different types of LEDs (e.g., different die areas and/or different light color emission, for example using different active region materials). In some embodiments, LEDs 110a-c can have different I-V characteristics (e.g., due to being different types of LEDs). In such instances, it may be desirable to modify the current amplitude and/or duration provided to each LED so as to obtain a desired intensity of light emission from each LED. This can be accomplished by tailoring the length of time that a given LED is on so as to obtain a desired integrated light output from a given LED. Alternatively, or additionally, different circuit elements (e.g., resistors, such as variable resistors) can be placed in series and/or parallel with different LEDs to allow for the modification of the amplitude of the current provided to each LED.

Although current flow through an LED can be accomplished by connecting an LED to a DC power supply, current would be limited by the series resistance of the circuit including the power supply, wiring, and the intrinsic resistance of the LED. In addition, the voltage drop through the LED can vary from device to device and can be temperature dependent which can make precise control of current difficult using only a fixed voltage source. In some embodiments, a current regulator circuit may be used to sense the LED current and feedback the signal to a control element that in turn can regulate the current and hence the light output to a desired value.

Figure 8:
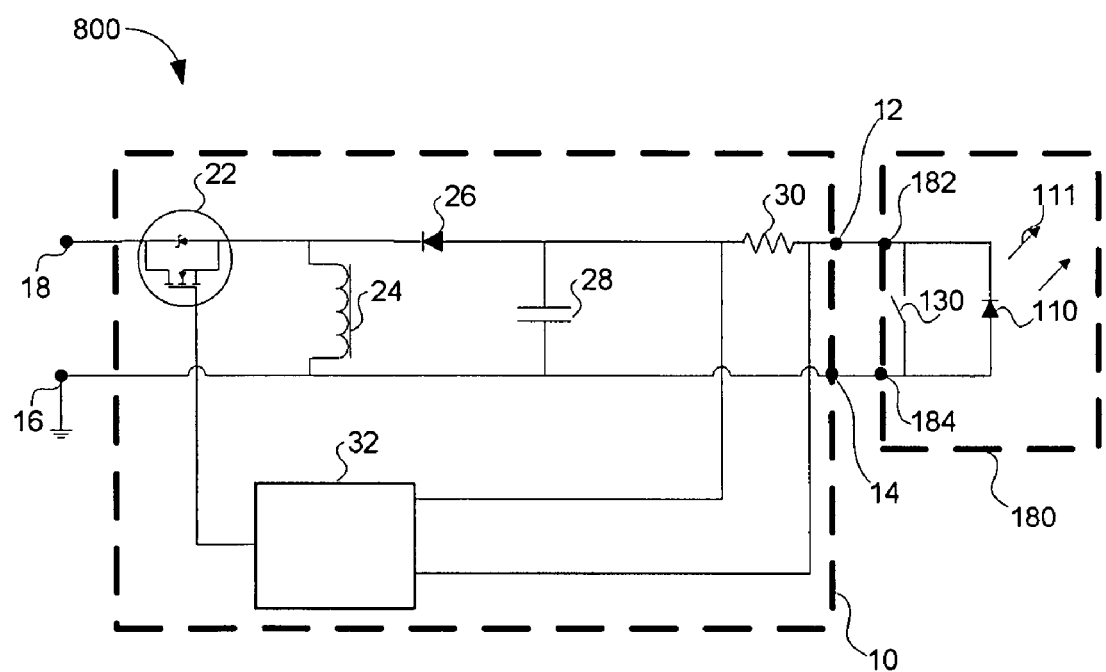
FIG. 8 is a schematic of a circuit including a current regulator for an LED, in accordance with one embodiment.

FIG. 8 illustrates an embodiment of a circuit 800 including a current regulator that can serve as a current source for an LED, in accordance with one embodiment. Circuit 800 is an embodiment of a polarity inverter topology for a common anode grounded LED assembly. The illustrated embodiment is just one example of a current driver topology for LED(s) in a common anode (e.g., grounded anodes) configuration.

Such an embodiment can address some drawbacks with conventional LED driver topologies that cater to the common cathode configuration of LEDs. To achieve a common anode configuration, some conventional driver solutions allow for a common anode referenced back to the high voltage side of a power supply. Such a solution does not allow for a grounded common anode configuration. However, in some LED assemblies, there exists a desire for a thermal management system (e.g., heat sink) and LED anodes (e.g., common anodes of a plurality of LEDs) to be at the same potential (e.g., ground potential) as the rest of the electronics of the housing it is placed in.

A polarity inverting topology can allow for a grounded common anode LED configuration. By using such a topology, a grounded common anode can be achieved. Such a topology can be used in an LED assembly in systems such as LCD backlight units (e.g., edge-lit and/or back-lit LCD assemblies).

In a polarity inverting topology, the output of the current regulator can be negative. Thus, a common ground can be at a higher potential than the output of the regulator. A common ground can be used to tie together the anodes of multiple LEDs. Such a configuration can allow the anode(s) to be grounded, which allows the anode(s) of one or more LED(s) to be at the same ground potential as the rest of the electronics and metal case of a system in which the LED assembly is incorporated.

Circuit 800 can include an LED 110 and a switching element 130 in parallel with the LED 110. As previously described, such a configuration allows for current to be provided between terminals 182 and 184, and the state of switch 130 (e.g., open or closed) determines whether current flows through the LED (and generates light 111) or the current switching element. Switching element 130 and LED 110 can be integrated in a common package, for example, a common substrate 180.

Circuit 800 can include a current source, including for example, a current regulator, to provide current to the LED/switching element. A current regulator can be part of an assembly 10 that can be separate from an integrated LED/switching element package and can be electrically connected via electrical wiring between terminal 12 of assembly 10 and terminal 182 of substrate 180. Terminal 14 of assembly 10 and terminal 184 of substrate 180 can also be electrically connected. Terminals 14 and 184 can be electrically connected to an electrical ground 16.

The current regulator can include a switch 22 (e.g., a FET) having source and drain terminals connected between a voltage input terminal 18 and a first terminal of an inductor 24, respectively. A gate terminal of switch 22 can be connected to an output terminal of a feedback control module 32. Inductor 24 can have a second terminal connected to ground. The first terminal of inductor 24 can also be electrically connected to a cathode of a diode 26. An anode of diode 26 can be electrically connected to a first plate of a capacitor 28. A second plate of capacitor 28 can be electrically connected to ground. The anode of diode 26 can be electrically connected to a first terminal of current sense device 30, such as a resistor. A second terminal of current sense device 30 can be electrically connected to terminal 12 of the current regulator assembly. The first terminal of current sense device 30 can be electrically connected to a first input of feedback control module 32. The second terminal of current sense device 30 can be electrically connected to a second input of feedback control module 32.

In operation, a positive voltage can be applied to terminal 18. When the gate terminal of switch 22 has an appropriate signal applied (e.g., set by feedback control module 32), switch 22 can be placed in a closed state and essentially acts as a closed circuit. In such a state, the first terminal of inductor 24 and the cathode of diode 26 are at a positive voltage. Since the second terminal of inductor 24 is grounded (e.g., at zero volts), current can begin to flow from the first terminal of inductor 24 to the second terminal of inductor 24. The current can then begin to charge capacitor 28 so that the voltage the first terminal of capacitor 28 is at a lower voltage than the grounded plate of the capacitor 28. Capacitor 28 effectively serves to produce a desired voltage output (e.g., a negative voltage) at terminal 12 of the regulator. The desired output can drive an applied load, for example, an LED load (e.g., one or more LEDs, which may include one or more switching elements) such as that illustrated for circuit 800.

During operation, the feedback control module 32 can regulate the operation of switch 22 based at least in part on the sensed current, which may be determined based on a voltage drop across current sense element 30. When the sensed current attains a desired value, which may be set by input to the feedback control module (e.g., by a designer or a user), feedback control module 32 can output a suitable signal (e.g., a voltage level) that is applied to the gate of switch 22 to place the switch in an open state. Switch 22 then acts as an open circuit and capacitor 28 can begin to discharge, resulting in a declining voltage on the first plate of capacitor 28. As a result, the current flowing through current sense element 30 begins to decline. When the current sensed by the feedback control drops below a lower threshold (e.g., inputted by a designer or a user), the feedback control module can output a suitable signal (e.g., a voltage level) that can be applied to the gate of switch 22 to place the switch in a closed state and as a result charge capacitor 28 once more. The cycle can repeat and can result in a regulated current level that may exhibit a small ripple effect (e.g., a 5% variation in peak to valley current). The frequency of the current ripple may be in the hundreds of kilohertz.

It should be appreciated that FIG. 8 illustrates one example of a current regulator that can drive one or more LEDs. FIG. 8 illustrates an example of a current regulator that can drive one or more LEDs having a grounded anode configuration. In other embodiments, a current regulator can drive one or more LEDs having a grounded cathode configuration.

Figure 9:
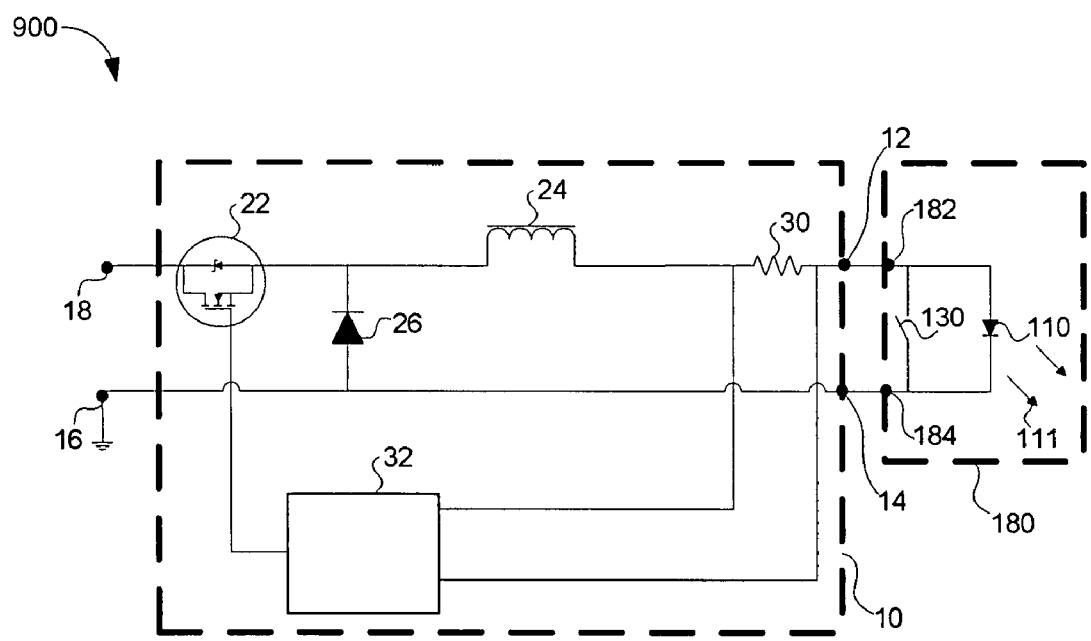
FIG. 9 is a schematic of a circuit including a current regulator for an LED, in accordance with one embodiment.

FIG. 9 illustrates an embodiment an embodiment of a circuit 900 including a current regulator that can serve as a current source for an LED, in accordance with one embodiment. Circuit 900 is an embodiment of a current regulator for a common cathode grounded LED assembly. The illustrated embodiment is just one example of a current driver topology for LED(s) in a common cathode (e.g., grounded cathodes) configuration.

Circuit 900 can include a current source, including for example, a current regulator, to provide current to the LED/switching element. The current regulator can include a switch 22 (e.g., a FET) having source and drain terminals connected between a voltage input terminal 18 and a first terminal of an inductor 24. A gate terminal of the switch 22 can be connected to an output terminal of a feedback control module 32. Inductor 24 can have a second terminal connected to a first terminal of current sense device 30, such as a resistor. A second terminal of current sense device 30 can be electrically connected to terminal 12 of the current regulator assembly. The first terminal of current sense device 30 can be electrically connected to a first input of the feedback control module 32. The second terminal of the current sense device 30 can be electrically connected to a second input of the feedback control module 32. A diode 26 may have a cathode connected to the first terminal of the inductor 24 and an anode connected to ground.

In operation, the current regulator can control current by employing inductor 24 to average high frequency voltage pulses from the switching element 22. The duty cycle of the switching element 22 can be controlled by a feedback control module based at least partially on the feedback signal from current sense element 30. For example, current sense element 30 can sense current in the inductor and can control switch 22. When current is first commanded, control module 32 can turn on switch 22 until current in the inductor reaches a desired value (peak current), at which time control module 32 can turn off switch 22. Current can then continue to flow and decay in inductor 24 and diode 26. When the current then decays below a hysteretic threshold (valley current), control module 32 can turn switch 22 on again, and the cycle can repeat. Inductor 24 can average the switching function into a DC current with a small (e.g., ¼ Amp) ripple current superimposed on the DC current. The amplitude of the ripple current can be reduced by increasing the frequency for a given inductor size. The current regulator can maintain a constant current (with a small amplitude ripple) in inductor 24. Switching element 130, in parallel with the load (e.g., LED 110), can shunt the current away from the load by shorting the output of the current source.

Figure 10A:
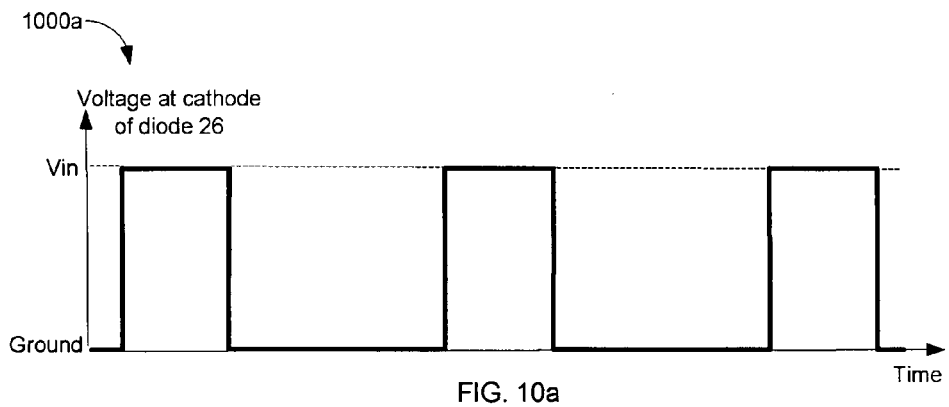
FIG. 10a is a waveform diagram of the voltage at the cathode of the diode in the current regulator of FIG. 9, in accordance with one embodiment.
Figure 10B:
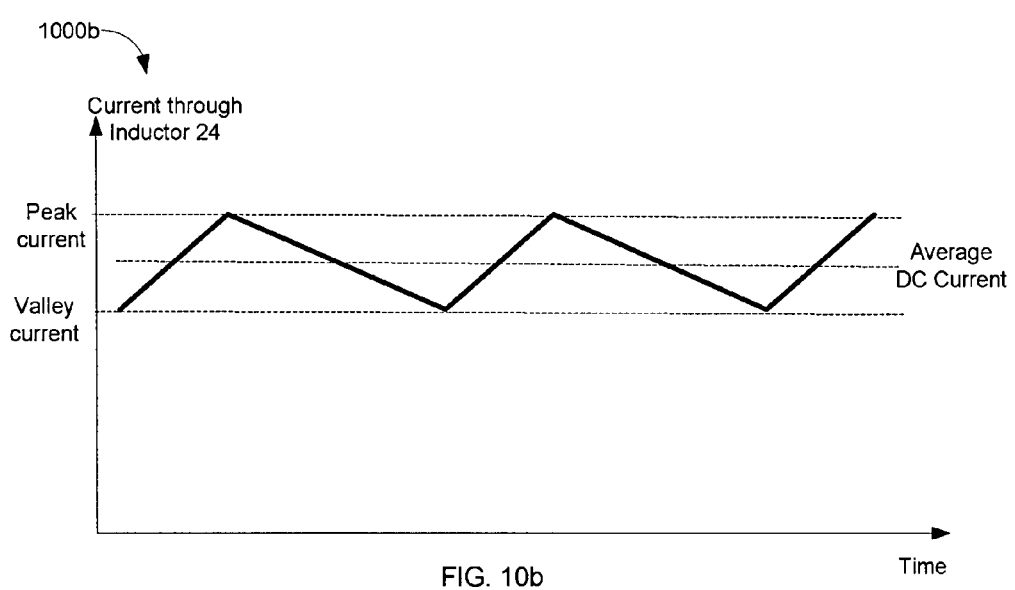
FIG. 10b is a waveform diagram of the current in the inductor of the current regulator of FIG. 9, in accordance with one embodiment.

Several different circuit topologies for such a switching regulator are possible, for example, a buck or step-down regulator topology may be used. A buck topology switching regulator may be used to produce a continuous current. Alternatively, other types of continuous current sources may be used, as the techniques are not limited in this respect. As described, a hysteretic current control method may be used to control the current level. Such a method can produce small amplitude waveform ripples, such as the example waveforms shown in FIGS. 10a-b. FIG. 10a illustrates a waveform 1000a of the voltage at the cathode of diode 26 as a function of time. FIG. 10b illustrates a waveform 1000b of the current in the inductor 24 as a function of time. The hysteretic regulator operation may be load independent, and thus may operate independent of the dynamics of the load. The hysteretic regulator can maintain the current in the inductor between two set values (e.g., between 10 Amps and 10.5 Amps). The difference between the two set values is called the ripple current and may be triangular in shape.

To achieve very fast rise and fall times, an output capacitor that reduces the ripple amplitude may be absent. The current regulator can switch back and forth between two current levels that form the hysteresis band. The switching frequency can be typically in the hundreds of kilohertz. A continuous current may therefore be established in a large inductor using the above-mentioned regulator. That current can flow continuously through either the load (e.g., LED) or through the shunt switching element (e.g., a transistor such as a FET). In some embodiments, a drive current provided to an LED (e.g., LED 110) is a continuous wave (CW) current. A CW current may be provided by placing switching element 130 in an open state. In other embodiments, a drive current provided to the LED (e.g., LED 110) is a pulsed wave current. A pulsed wave current may be provided by opening and closing switching element 130 (e.g., via the application of appropriate gate voltages in the case of a FET switch) thereby shunting the current away from the LED path during time intervals when no LED light emission is desired, as previously described.

Figure 11:
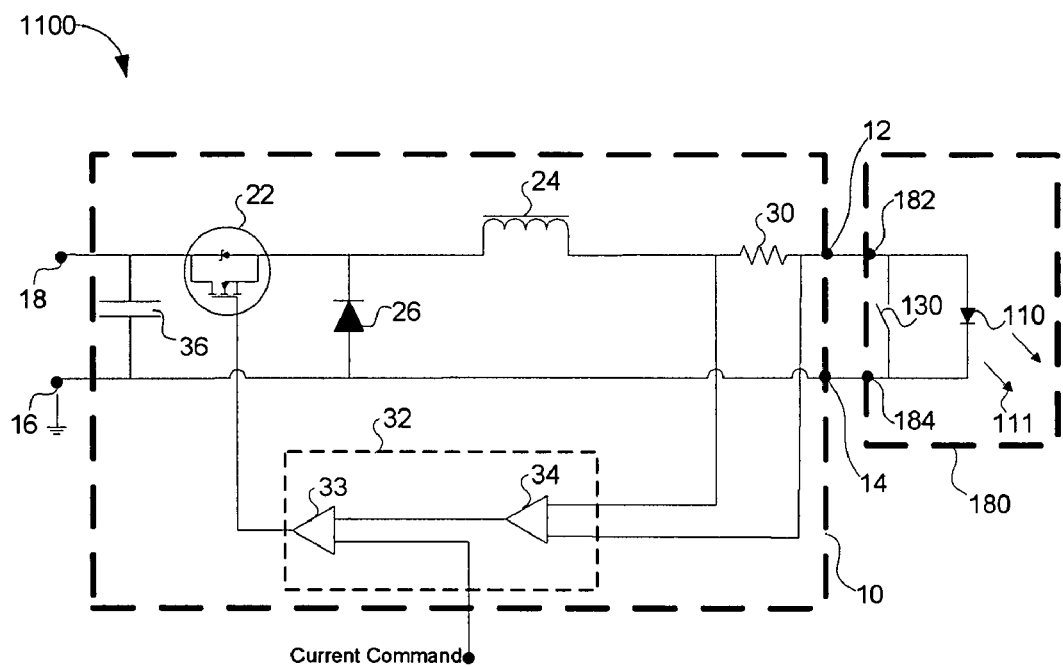
FIG. 11 is a schematic of a circuit including a current regulator for an LED, in accordance with one embodiment.

FIG. 11 illustrates an embodiment of a circuit 1100 including a current regulator that can serve as a current source for an LED, in accordance with one embodiment. Circuit 1100 is an embodiment of a current regulator for a common cathode grounded LED assembly, similar to circuit 900 that was previously described. Circuit 1100 differs from circuit 900 in that input capacitor 36 may be present across the input voltage terminal 18 and ground 16. Input capacitor 36 can store energy and average out large peak currents drawn by the circuit. Circuit 1100 also illustrates an example of a feedback control module 32 that can include an error amplifier 34 and a comparator 33. Error amplifier 34 can receive two voltage inputs associated with the voltage drop across current sense element 30. A signal indicative of current can be output by the error amplifier 34 to a first input of comparator 33, and a second input of comparator 33 can receive a current command (e.g., provided by a designer or a user) indicative of the desired drive current to be supplied to the LED 110. Operation of the current regulator of circuit 1100 is similar to that of circuit 900.

It should be appreciated that FIGS. 8, 9 and 11 are just some examples of circuits that can drive an LED load (e.g., one or more LEDs), and other circuit topologies can be used to provide power (e.g., current) to one or more LEDs.

As previously described, a switching element can be integrated with a LED to allow for fast rise/fall times associated with the pulsing of a large current through one or more LEDs. The switching element can be connected in parallel with the LED to serve as a shunt path for continuous current provided to the LED/switching element pair. Integration of the LED with a switching element may be on a package level (e.g., on a metal-core board) and/or a die level (e.g., monolithic integration).

In some embodiments, an LED and an associated switching element may be integrated on a common substrate. In some embodiments, the common substrate can include copper, copper-tungsten, aluminum nitride, silicon carbide, beryllium-oxide, diamond, graphite, graphite-composites, and/or aluminum. In some embodiments, the common substrate is a die substrate, for example a semiconductor substrate (e.g., a gallium nitride substrate, a gallium arsenide substrate, a germanium substrate, a silicon substrate). In some embodiments, the common substrate can be a sub-mount, for example a metal sub-mount (e.g., a copper sub-mount, a copper-tungsten sub-mount). In some embodiments, the common substrate can be a sub-package, for example an electrically insulating sub-package (e.g., a ceramic sub-package, such as an aluminum nitride sub-package). In some embodiments, the common substrate can be a circuit board, for example a metal-core board. In some embodiments, the common substrate can be a portion (or all) of a thermal management system, for example one or more heat pipes and/or vapor plates.

Figure 12:
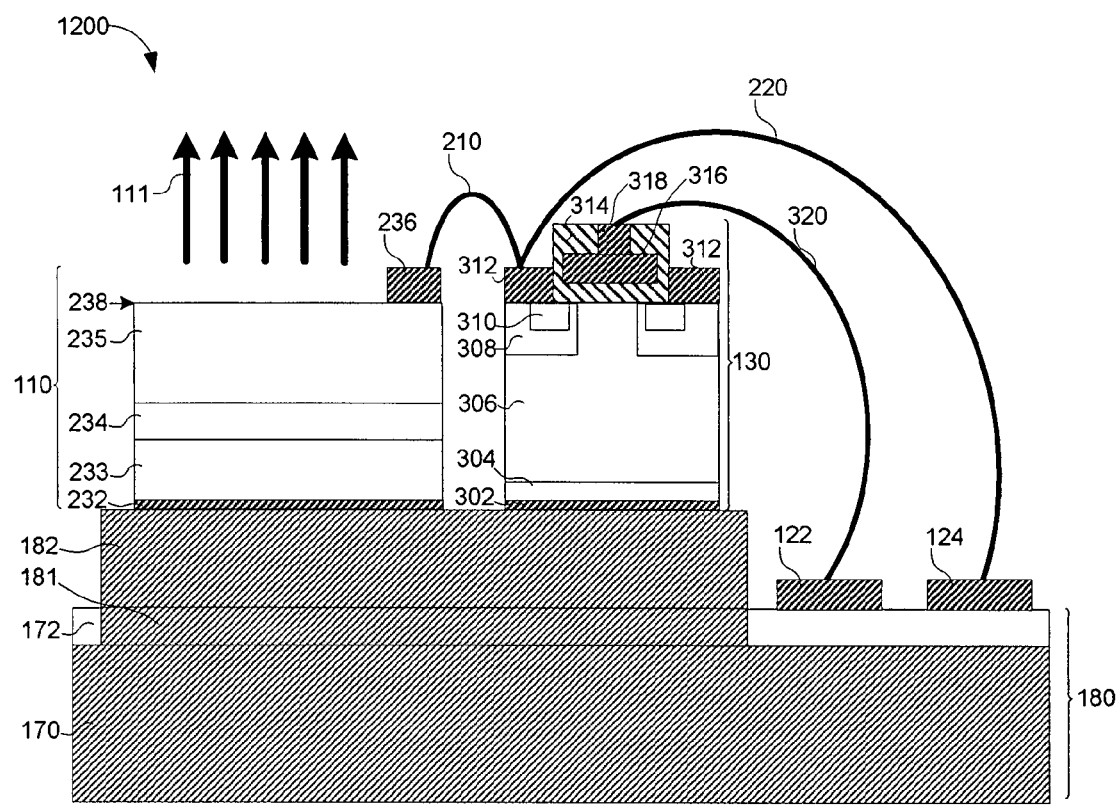
FIG. 12 is a cross-section schematic of a light emitting component including an LED and a switching element, in accordance with one embodiment.

FIG. 12 illustrates a cross-section of a light emitting component 1200 including an LED 110 and an integrated switching element 130. LED 110 and switching element 130 can be supported by a substrate 180.

LED 110 can include a material stack that generates light in an active region 234. LED 110 can be formed of any suitable materials, including but not limited to semiconductors, polymers, and/or other suitable materials. LED 110 can include an emission surface 238 from which light 111 can be emitted through. LED 110 can include a doped region 235 with a first type of dopant (e.g., n or p) over active region 234 and a doped region 233 with a second type of dopant (e.g., p or n) under active region 234. A topside electrical contact 236 may be located on the surface of the LED 110. A reflective layer 232 (e.g., a metal, such as silver and/or aluminum) can be located under layer 232 and can serve as a backside mirror. Reflective layer 232 can be electrically' conductive and can serve as a backside electrical contact.

Switching element 130 can include a transistor. Switching element 130 may include a bipolar junction transistor (BJT) and/or a field-effect transistor (FET). In some embodiments, the switching element may include an insulated gate bipolar transistor (IGBT). In some embodiments, the switching element may include a vertical transistor (e.g., FET, IGBT). As illustrated in FIG. 12, switching element 130 may include a die, for example a semiconductor die (e.g., silicon die), having various doped semiconductor regions. Switching element 130 can include top electrical contacts 312 and a backside electrical contact 302. Top electrical contacts 312 can be metal regions in contact with semiconductor doped regions 308 and 310. Regions 308 can include highly doped regions of a first conductivity, for example p+ doped regions. Regions 310 can include highly doped regions of a second conductivity, for example n+ doped regions. Region 304 can include a highly doped region that may be in contact with backside electrical contact 302. In the case of a vertical FET, region 304 can include a highly doped region of the second conductivity, for example an n+ doped region. In the case of an IGBT, region 304 can include a highly doped region of the first conductivity, for example a p+ doped region. A lightly doped region 306' of the second conductivity, for example an n− doped region, can separate regions 310 and 308 from region 302. Region 306 can form the majority of the semiconductor bulk. The doped regions 304, 306, 310, 308, and/or 310 can be formed with techniques known to those of ordinary skill in the art, including dopant ion implantation through masks and/or dopant diffusion.

Switching element 130 can include a gate electrode 316 that can be separated from the rest of the structure by gate dielectric 314. Gate electrode 316 can be formed of any suitable electrically conductive material, such as one or more metals and/or one or more highly doped semiconductors. Gate dielectric 314 can be formed of one or more electrically insulating materials, such as oxides, for example silicon oxides, silicon nitride, and/or combination thereof. An electrical contact 318 (e.g., a metal contact) may provide for electrical contact to gate electrode 316.

The cross-sectional structure of switching element 130 is typical of a single cell of a vertically diffused MOSFET (VDMOS) or IGBT. However, it should be appreciated that the illustrated cell can be on the order of micrometers to some tens of micrometers wide and that a power transistor may include multiple cells arranged in parallel (e.g., several thousand cells). The gate geometry of a power transistor can include a meshed gate geometry (e.g., with square and/or rectangular gates) or parallel gate stripes.

Substrate 180 can include a base substrate 170. Base substrate 170 may be electrically conductive and/or thermally conductive. In one embodiment, base substrate 170 can include a metal substrate, for example a copper base substrate, an aluminum base substrate, and/or any other suitable metal substrate. An electrically insulating layer 172 can be disposed over the base substrate 170. Insulating layer 172 can include a dielectric material layer. Conductive lines (e.g., metal traces), such as 122 and 124, can be formed over the dielectric material layer and can provide for electrical connections between one or more elements supported by substrate 180.

An optional layer 182 can provide an intermediate support for LED 110 and switching element 130. In some embodiments, layer 182 may be electrically and/or thermally conductive. LED 110 and/or switching element 130 can be attached to layer 130, using any suitable attachment material and/or method. Possible attachment materials include solder, eutectic bonding, epoxy (e.g., conductive epoxy). In some embodiments, layer 182 includes a sub-mount on which LED 110 and switching element 130 can be bonded, for example a metal sub-mount. In some embodiments, layer 182 includes a sub-package layer. In some embodiments, layer 182 is an extension of the base substrate 170. In some embodiments, a filled via 181 (e.g., a metal-filled via) can provide for electrical and/or thermal connection between layer 182 and base substrate 170. Layer 182 and layer 181 can have similar lateral sizes. Alternatively, layer 182 can have a larger lateral size than layer 181, or layer 181 can have a larger lateral size that layer 182. In some embodiments, layer 182 is absent and the LED 110 and/or switching element 130 are attached directly to layer 181 or directly to base substrate 170. Examples of LED packages that may include a base substrate are described in, for example, U.S. patent application Ser. No. 11/521,092, entitled "Light-Emitting Devices and Methods for Manufacturing the Same," filed on Sep. 14, 2006, which is herein incorporated by reference in its entirety.

Electrical connections between LED 110, switching element 130, and/or conductive lines on substrate 180 can be provided by wire bonds. As illustrated in FIG. 12, wire bond 210 can provide for electrical connection between contact 236 of LED 110 and contact 312 of switching element 130. Backside contacting to LED 110 and switching element 130 can be provided by electrical conduction through the base substrate 170. Alternatively, the backsides of LED 110 and switching element 130 can be contacted by electrical trace lines that may be disposed over electrically insulating layer 172. Wire bond 220 may provide for electrical connection between contact 312 of switching element 130 (and/or contact 236 of LED 110) and conductive line 124. Wire bond 320 may provide for electrical connection between gate contact 318 of switching element 130 and conductive line 122. Conductive lines 122 and/or 124 can then be externally contacted via a connector element and/or soldering of wire leads.

Figure 13:
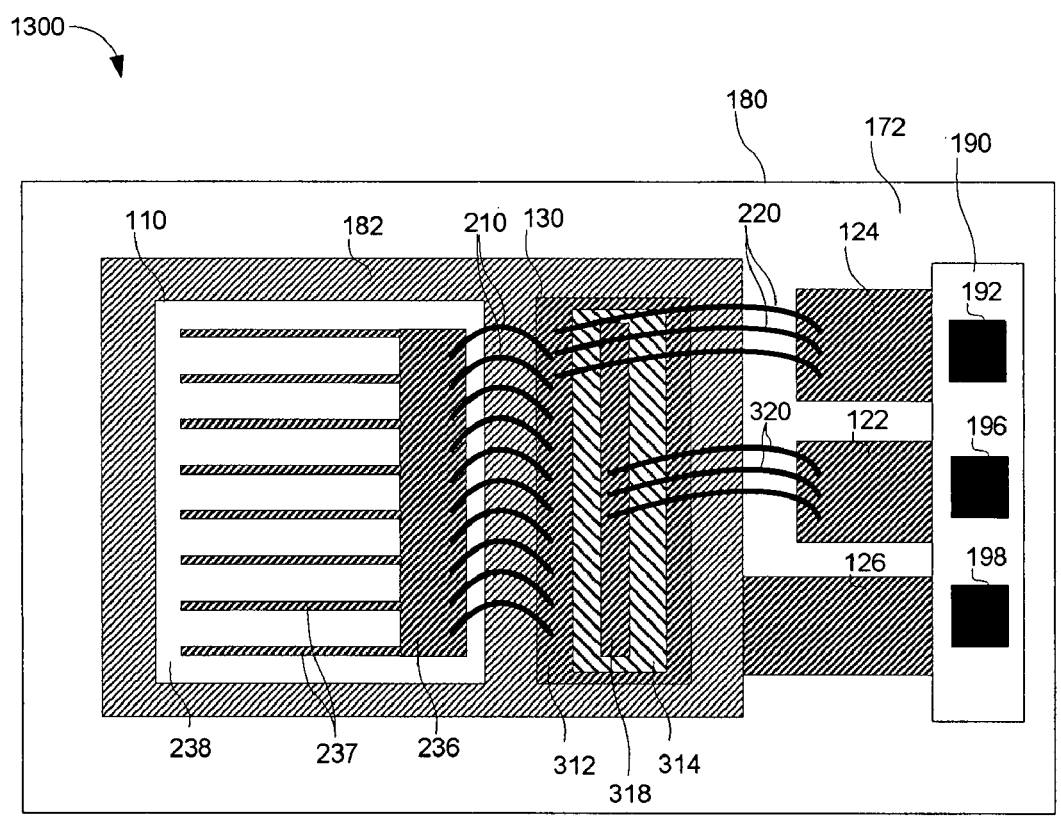
FIG. 13 is a top view of a light emitting component including an LED and a switching element, in accordance with one embodiment.

FIG. 13 illustrates a top view of a light emitting component 1300 including an LED 110 and an integrated switching element 130. It should be appreciated that FIG. 13 is an illustration of a top view of a component similar to the light emitting component 1200 shown in the cross-section drawing of FIG. 12. The top view of light emitting component 1300 illustrates an embodiment where a side of LED 110 has a substantially similar length as a side of switching element 130 allowing for a compact form factor for light emitting component 1300.

LED 110 contact 236 can be electrically connected to switching element contact 312 by one or more wire bonds 210. Wire bonds 210 can include wire including any suitable metal, including but not limited to gold, copper, aluminum, or combinations thereof. Any number of wire bonds 210 can be used provide for electrical interconnection between contacts. The wiring inductance between the LED 110 contact 236 and switching element contact 312 can vary inversely with the number of wire bonds. Thus, the wiring inductance between the LED 110 contact 236 and switching element 130 contact 312 can be reduced by increasing the number of wire bonds. Alternatively, or additionally, wire bonds with larger diameters can be used to reduce the wiring inductance between LED 110 and switching element 130. As previously described, reducing the wiring inductance between the LED 110 and the switching element 130 can facilitate the operation of the LED 110 with short rise/fall times. Such a configuration can facilitate large current operation with short rise/fall times.

One or more wire bonds 220 can provide for an electrical connection between contact 312 of switching element 130 and conductive line 124. Wire bonds 320 can provide for an electrical connection between gate contact 318 of switching element 130 and conductive line 122. Conducive line 126 can provide for electrical connection to the backside of LED 110 and switching element 130. Alternatively, or additionally, conductive line 126 can be electrically connected to a conducive via (e.g., a metal filled via) that provides for electrical connection to electrically conductive base substrate 170. The backsides of LED 110 and switching element 130 can then be electrically connected to the electrically conducive base substrate 170, for example, as illustrated in the cross-section drawing of FIG. 12. Conductive lines 124, 122, and 126 can be connected to pins 192, 196, and 198, respectively, of connector 190.

FIG. 13 also illustrates an LED embodiment including current injection contacts 237 disposed on the emission surface 238. The current injection contacts 237 can include conductive fingers (e.g., metal fingers, conductive transparent material fingers, for example transparent conductive oxide fingers) that provide for current injection over a substantial portion of the LED surface. Examples of LED electrical contacts are described in, for example, U.S. patent application Ser. No. 11/357,743, entitled "Electronic Device Contact Structures," filed on Feb. 16, 2006, which is herein incorporated by reference in its entirety.

In some embodiments, switching element 130 may include an exposed die (e.g., a semiconductor die). Since light is emitted through emission surface 238 of LED 110 and switching element 130 may be in close proximity to the LED (e.g., to reduce wiring inductance between the LED and switching element), light emitted by the LED could be partially absorbed by the switching element 130 and impact the operation of switching element 130. For example, if switching element 130 includes a silicon die, the silicon material could absorb light having any light having a wavelength greater than the bandgap of silicon. To reduce and/or eliminate the absorption of light by switching element 130, a material that is non-transparent to light (e.g., light having the emission wavelength of the LED) can encapsulate the region surrounding the switching element 130. A non-transparent material, for example a black epoxy, can be used to encapsulate the switching element 130. Coating or encapsulation of switching element 130 with a non-transparent material can be performed after wire bonding.

Figure 14:
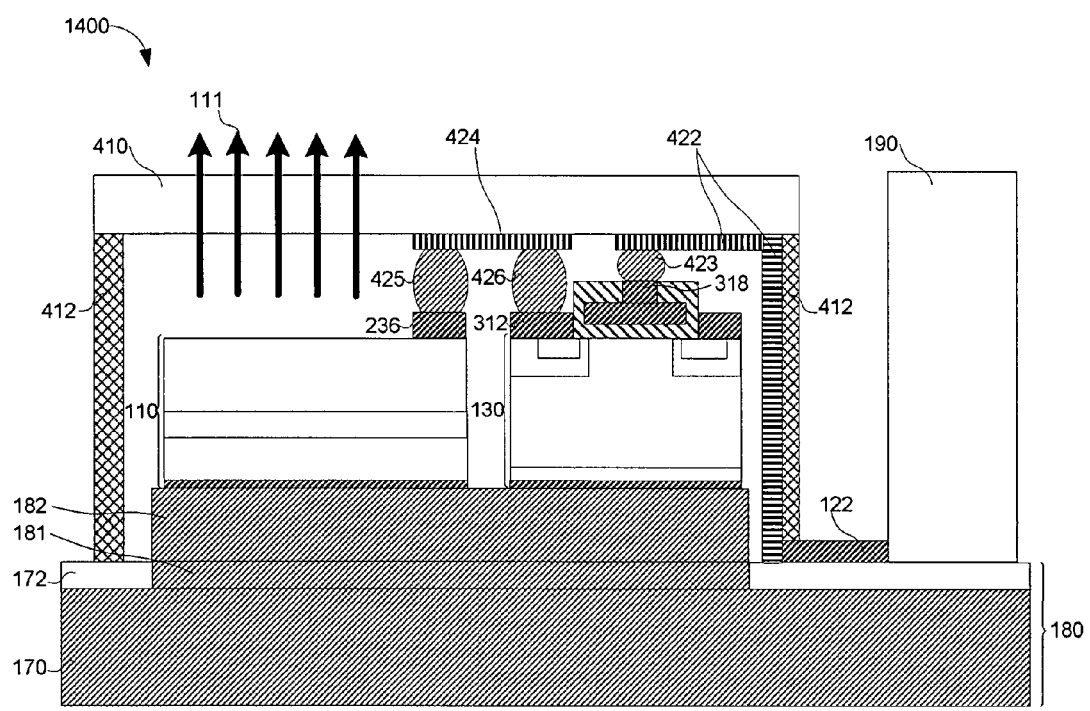
FIG. 14 is a cross-section schematic of a light emitting component including an LED and a switching element, in accordance with one embodiment.
Figure 15:
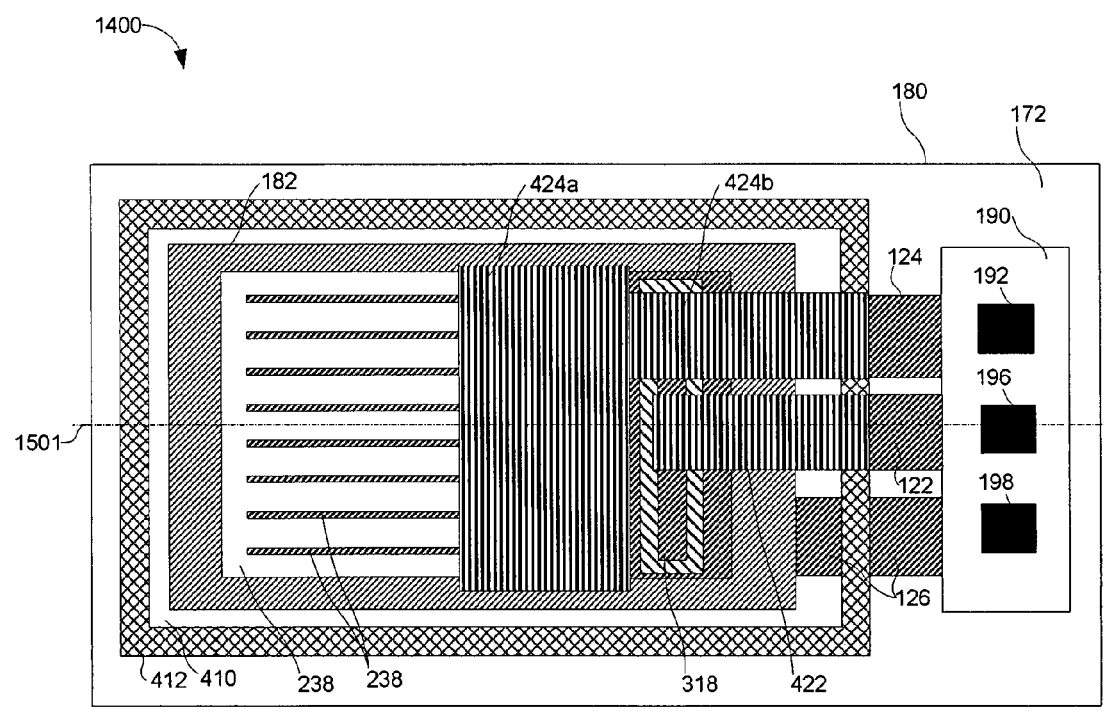
FIG. 15 is a top view of the light emitting component of FIG. 14, in accordance with one embodiment.

FIGS. 14 and 15 illustrate a side view (along line 1501) and a top view, respectively, of light emitting component 1400 that includes one or more conductive lines to provide for electrical interconnection between LED 110 and switching element 130. In some embodiments, one or more conductive lines that provide for electrical interconnection between LED 110 and switching element 130 can be disposed on a window 410 and/or a frame 412.

Window 410 may include a transparent portion that allows emitted light 111 to transmit through window 410. Window 410 can include a glass layer, a fused silica layer, a polymer layer, and/or other suitable material layer(s). Frame 412 can be formed of transparent and/or non-transparent material(s). Frame 412 can include a ceramic material, including a non-oxide ceramic (e.g., aluminum nitride) and/or an oxide ceramic.

Conductive lines 422 and/or 424 can be formed of one or more electrically conductive materials, for example one or more metals (e.g., copper, gold, silver, aluminum), one or more electrically conductive polymers, and/or one or more transparent conductive materials (e.g., transparent conductive oxides such as indium tin oxide). Conductive lines 422 and/or 424 can be patterned (e.g., from a conductive layer deposited inside the window/frame assembly) via any suitable patterning method. The patterning method can include a lithography process, such as photo-lithography or an imprint process. Alternatively, or additionally, conductive lines 422 and/or 424 may be formed by deposition (e.g., evaporation, sputtering, coating) of a conductive material (e.g., metal, conductive polymer, transparent conductive material, for example a transparent conductive oxide). The deposition process can include selectively depositing the conductive material over a patterned mask layer having exposed regions and then lifting off any conductive material present over the mask by removing the mask layer (e.g., via a lift-off process).

As illustrated in the top view of FIG. 15, conductive line 424 can include a conductive region 424a that can be disposed over both contact 236 of LED 110 and contact 312 of switching element 130. Conductive region 424a can have any desirable width so as to reduce the interconnection inductance between LED 110 and switching element 130. Conductive region 424a can have a width greater than or equal to the width of the LED and/or switching element. Conductive region 424a can have a width greater than or equal to the width of LED contact 236 and/or switching element contact 312. Conductive region 424b can be disposed between region 424a and extend down one or more sides of frame 412 to provide for electrical connection to conductive line 124. Conductive line 422 can be disposed over a portion or all of gate contact 318 of switching element 130. Conductive line 422 can extend down one or more sides of frame 412 to provide for electrical connection to conductive line 122.

Bump bonding 425 and 426 (e.g., solder bump) can be disposed in contact with conductive region 424a of conductive line 424 and contacts 236 and 312. Bump bonding 423 (e.g., solder bump) can be disposed in contact with conductive line 422 and contact 318. Examples of LED packages are described in, for example, U.S. Pat. No. 7,170,100, entitled "Packaging designs for LEDs," filed on Aug. 23, 2005, which is herein incorporated by reference in its entirety.

Figure 16:
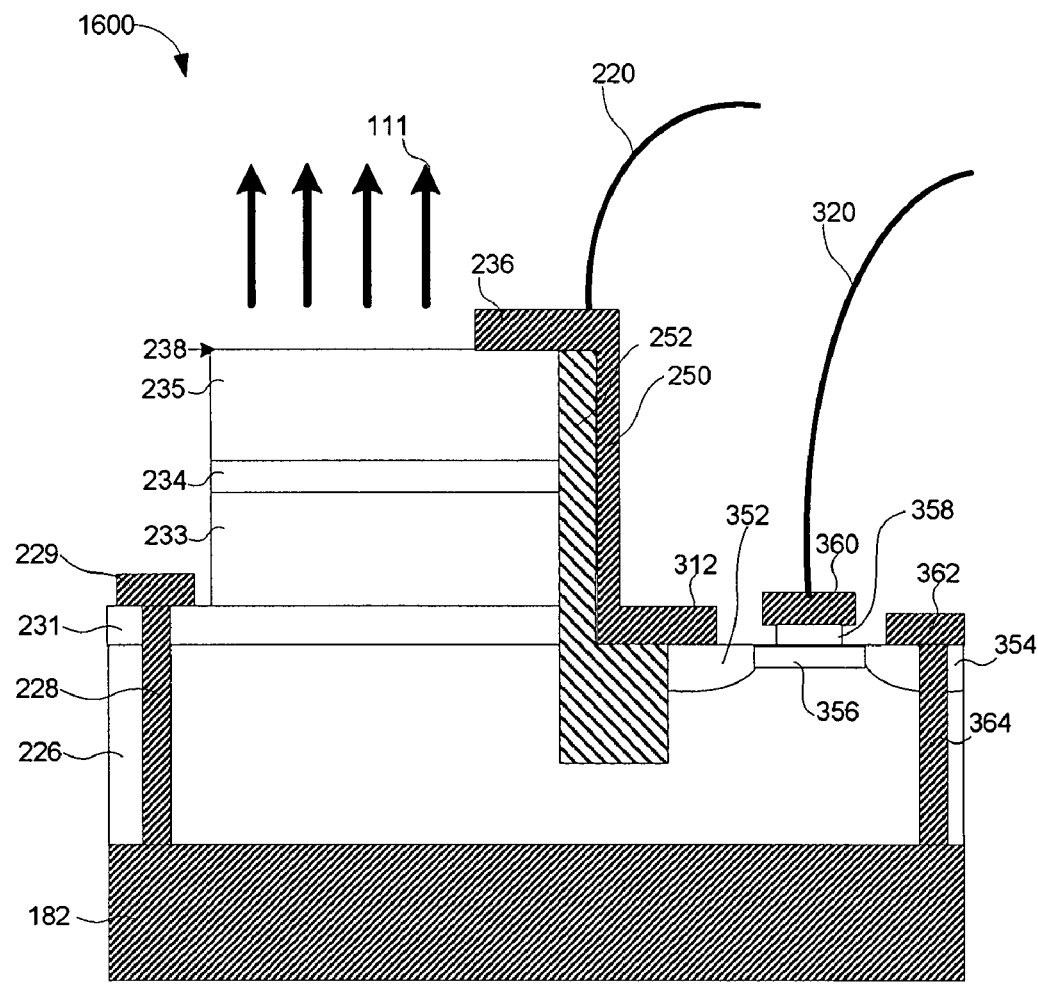
FIG. 16 a cross-section schematic of a light emitting component including a monolithically integrated LED and switching element, in accordance with one embodiment.

FIG. 16 illustrates an embodiment of light emitting component 1600 including a switching element monolithically integrated with an LED. Monolithic integration can enable the reduction (e.g., as compared to wire bonds or circuit board level conductive interconnections) of the inductance of electrical interconnections between an LED and a switching element by allowing the LED and switching element to be located in closer proximately. The close proximately between LED(s) and corresponding switching element(s) can allow the electrical interconnection length to be reduced which results in a lower interconnection inductance.

Light emitting component 1600 can include an LED portion that can emit light 111 and a switching element portion that can allow for the switching of the LED. The LED portion and the switching element portion can be monolithically integrated on a common layer 226, for example a common underlying semiconductor layer (e.g., a III-V semiconductor, for example a III-nitride semiconductor layer such as GaN, AlN, InN, and/or combination thereof, GaAs, AlAs, GaP, InAs, and/or combinations thereof, a group IV semiconductor, such as silicon, germanium, or combinations thereof). In some embodiments, common layer 226 can be an intrinsic semiconductor layer. In some embodiments, common layer 226 can be a semi-insulating semiconductor layer (e.g., a semi-insulating III-V semiconductor). In one embodiment, the common semiconductor layer 226 is a silicon substrate and the LED portion is deposited (e.g., epitaxial growth) over the silicon substrate and a switching element can be formed of silicon (e.g., the switching element can be a silicon vertical FET that can extend from the bottom of the silicon substrate to the top) and/or out of the epitxially grown materials (e.g., a III-V material). For example, GaN on silicon substrates can be obtained from Shimei Semiconductor Company of Japan.

Common layer 226 can be disposed over a layer 182. In some embodiments, layer 182 can be an electrically conductive layer, for example one or more metal layers (e.g., copper, copper-tungsten, aluminum). Layer 182 can be part or all of a sub-mount structure that supports common layer 226. Alternatively, or additionally, layer 182 may be a thin layer deposited on the backside of a semiconductor substrate layer 226. Layer 182 (e.g., sub-mount) may in turn be supported by a metal-core board. Alternatively, or additionally, layer 182 can be part of a metal-core board that directly supports common layer 226. In some embodiments, layer 182 can be electrically grounded.

The LED portion of light emitting component 1600 can include a material stack that generates light in an active region 234. The LED portion can be formed of any suitable materials, including but not limited to semiconductors, organics, and/or other suitable materials. The LED portion can include an emission surface 238 from which light 111 can be emitted through. The LED can include a doped region 235 with a first type of dopant (e.g., n or p) over active region 234 and a doped region 233 with a second type of dopant (e.g., p or n) under active region 234. A topside electrical contact 236 may be located on the surface of the LED 110. A current spreading region 231 can be disposed under region 233 and can serve as a current spreading layer. Current spreading region 231 can be a highly doped region with a second type of dopant (e.g., p or n). A reflective layer (not shown), for example a semiconductor Bragg reflector, can be disposed under or over current spreading region 231, which can reflect light generated in active region 234 back towards the emission surface 238. Contact 229 and metal-filled via 228 can provide for electrical connection between current spreading region 231 and layer 182 which can be electrically conductive, thereby enabling a backside electrical contact to the LED portion. However, if layer 226 is highly conductive (e.g., a highly doped semiconductor) the via 228 may be omitted and a backside electrical contact may still be possible via electrical conduction through layer 226.

The switching element portion of light emitting component 1600 can include any suitable switch that can provide current shunting away from the LED portion. The switch can include a vertical transistor structure and/or a lateral transistor structure. Although FIG. 16 illustrates a structure including a lateral transistor structure, the techniques presented herein are not limited in this respect. The switching element portion can include source and drain doped regions 352 and 354 (of a first conductivity type). A doped channel region 356 (of a first conductivity type) can be disposed between the source and drain doped regions 352 and 354. A doped gate region 358 (of a second conductivity type) can be disposed over the channel region 356. A gate electrode 360 can be disposed over the doped gate region 358. Electrical contacts 312 and 362 can be disposed over the source and drain doped regions 352 and 362, respectively. Metal-filed via 364 can provide for electrical connection between contact 362 and layer 182 which can be electrically conductive, thereby enabling a backside electrical contact to the switching element portion. Examples of GaN-based FETs are described in, for example, U.S. Pat. No. 5,866,925, entitled "Gallium Nitride Junction Field-Effect Transistor," filed on Jan. 9, 1997, and U.S. Pat. No. 7,038,253, entitled "GaN-based Field Effect Transistor of a Normally-off Type," filed on Aug. 18, 2004, which are herein incorporated by reference in their entirety.

In embodiments where the switching element is a vertical FET, the metal-filled via can be absent and the backside of the layer 226 can serve as a source (or drain) and conduction can occur through the bulk of layer 226.

An electrically insulating region 252 (e.g., an oxide region, for example a deposited silicon oxide, silicon nitride, or combinations thereof) can be disposed adjacent an exposed side of the LED portion, including exposed regions 235, 234, 233, and 232. Electrical interconnect 250 can provide for an electrical connection between contact 236 of the LED and contact 312 of the switching element. Electrical interconnect 250 can be a patterned metal line (e.g., formed by lithography) having a suitable width. Electrical interconnect 250 can have any desirable dimensions (e.g., length, width, and/or thickness) which can be selected to reduce the interconnection inductance between the LED and the switching element. In some embodiments, the switching element and the LED portion are less than 100 microns apart (e.g., less than 50 microns, less than 25 microns) which can significantly reduce the wiring interconnect inductance.

Light emitting component 1600 can be formed using standard processing techniques know to those of ordinary skill in the art. In some embodiments, a starting substrate (e.g., substrate 226) serves as a platform on which LED stack layers (e.g., layers 231, 233, 234, and 235) can be deposited. Deposition may include epitaxial growth process, such as chemical vapor deposition (e.g., metalorganic CVD) and/or molecular beam epitaxy (MBE). In some embodiments, the LED stack layers may be deposited over a selective area, for example using selective area deposition techniques wherein growth may occur within an exposed region of a substrate and not over a masked region of the substrate. The masked region of the substrate can include the area of the substrate where the switching element may reside. Alternatively, deposition of the LED stack may occur over the entire substrate and the LED stack layers can then be removed (e.g., via dry and/or wet etching) in areas when the switching element can be fabricated.

Figure 17:
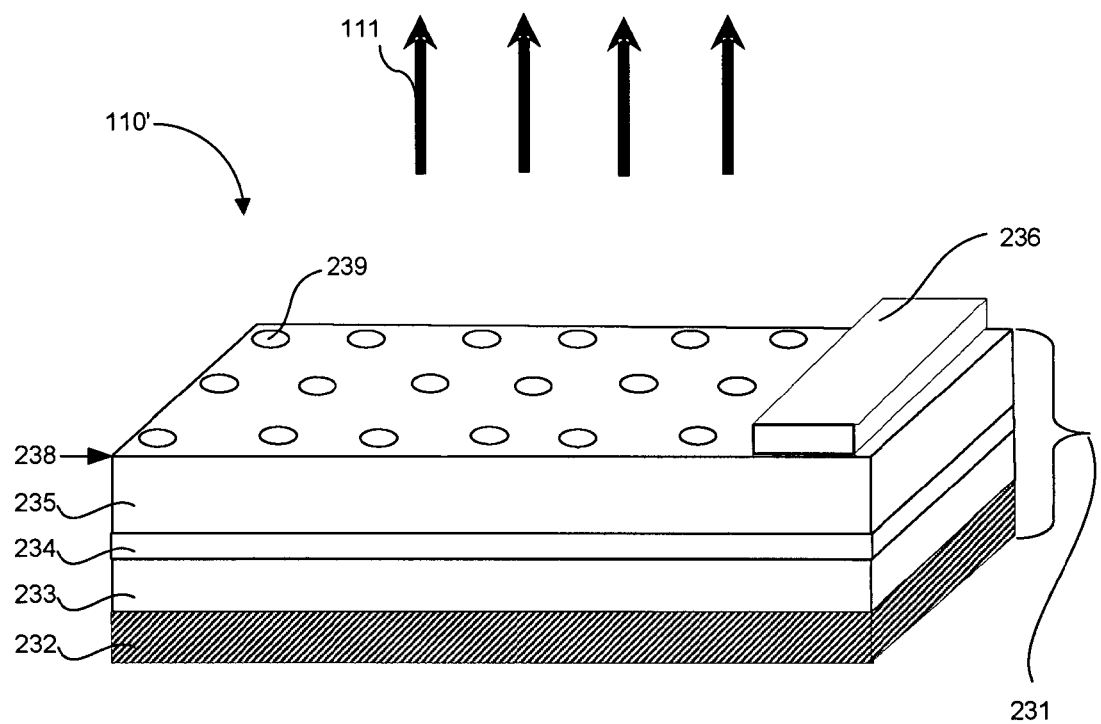
FIG. 17 is a schematic of a light emitting die.

FIG. 17 illustrates a light emitting diode (LED) that may be part of a light emitting component, in accordance with one embodiment. It should also be understood that various embodiments presented herein can also be applied to other light emitting devices, such as laser diodes, and LEDs having different structures (such as organic LEDs, also referred to as OLEDs).

LED 110' shown in FIG. 17 comprises a multi-layer stack 231 that may be disposed on a support structure (e.g., a sub-mount). The multi-layer stack 231 can include an active region 234 which is formed between n-doped layer(s) 235 and p-doped layer(s) 233. The stack can also include an electrically conductive layer 232 which may serve as a p-side contact, which can also serve as an optically reflective layer. An n-side contact pad 236 is disposed on layer 235. It should be appreciated that the LED is not limited to the configuration shown in FIG. 17, for example, the n-doped and p-doped sides may be interchanged so as to form a LED having a p-doped region in contact with the contact pad 236 and an n-doped region in contact with layer 232. As described further below, electrical potential may be applied to the contact pads which can result in light generation within active region 234 and emission of at least some of the light generated through an emission surface 238. As described further below, openings 239 may be defined in a light-emitting interface (e.g., emission surface 238) to form a pattern that can influence light emission characteristics, such as light extraction and/or light collimation. It should be understood that other modifications can be made to the representative LED structure presented, and that embodiments are not limited in this respect.

The active region of an LED can include one or more quantum wells surrounded by barrier layers. The quantum well structure may be defined by a semiconductor material layer (e.g., in a single quantum well), or more than one semiconductor material layers (e.g., in multiple quantum wells), with a smaller electronic band gap as compared to the barrier layers. Suitable semiconductor material layers for the quantum well structures can include InGaN, AlGaN, GaN and combinations of these layers (e.g., alternating InGaN/GaN layers, where a GaN layer serves as a barrier layer). In general, LEDs can include an active region comprising one or more semiconductors materials, including III-V semiconductors (e.g., GaAs, AlGaAs, AlGaP, GaP, GaAsP, InGaAs, InAs, InP, GaN, InGaN, InGaAlP, AlGaN, as well as combinations and alloys thereof), II-VI semiconductors (e.g., ZnSe, CdSe, ZnCdSe, ZnTe, ZnTeSe, ZnS, ZnSSe, as well as combinations and alloys thereof), and/or other semiconductors. Other light-emitting materials are possible such as quantum dots or organic light-emission layers.

The n-doped layer(s) 235 can include a silicon-doped GaN layer (e.g., having a thickness of about 4000 nm thick) and/or the p-doped layer(s) 233 can include a magnesium-doped GaN layer (e.g., having a thickness of about 40 nm thick). The electrically conductive layer 232 may be a silver layer (e.g., having a thickness of about 100 nm), which may also serve as a reflective layer (e.g., that reflects upwards any downward propagating light generated by the active region 234). Furthermore, although not shown, other layers may also be included in the LED; for example, an AlGaN layer may be disposed between the active region 234 and the p-doped layer(s) 233. It should be understood that compositions other than those described herein may also be suitable for the layers of the LED.

As a result of openings 239, the LED can have a dielectric function that varies spatially according to a pattern. The dielectric function that varies spatially according to a pattern can influence the extraction efficiency and/or collimation of light emitted by the LED. In some embodiments, a layer of the LED may have a dielectric function that varies spatially according to a pattern. In the illustrative LED 110', the pattern is formed of openings, but it should be appreciated that the variation of the dielectric function at an interface need not necessarily result from openings. Any suitable way of producing a variation in dielectric function according to a pattern may be used. For example, the pattern may be formed by varying the composition of layer 235 and/or emission surface 238. The pattern may be periodic (e.g., having a simple repeat cell, or having a complex repeat super-cell), or non-periodic. As referred to herein, a complex periodic pattern is a pattern that has more than one feature in each unit cell that repeats in a periodic fashion. Examples of complex periodic patterns include honeycomb patterns, honeycomb base patterns, (2×2) base patterns, ring patterns, and Archimedean patterns. In some embodiments, a complex periodic pattern can have certain holes with one diameter and other holes with a smaller diameter. As referred to herein, a non-periodic pattern is a pattern that has no translational symmetry over a unit cell that has a length that is at least 50 times the peak wavelength of light generated by one or more light-generating portions. Examples of non-periodic patterns include aperiodic patterns, quasi-crystalline patterns (e.g., quasi-crystal patterns having 8-fold symmetry), Robinson patterns, and Amman patterns. A non-periodic pattern can also include a detuned pattern (as described in U.S. Pat. No. 6,831,302 by Erchak, et al., which is incorporated herein by reference in its entirety). In some embodiments, a device may include a roughened surface. The surface roughness may have, for example, a root-mean-square (rms) roughness about equal to an average feature size which may be related to the wavelength of the emitted light.

In certain embodiments, an interface of a light-emitting device is patterned with openings which can form a photonic lattice. Suitable LEDs having a dielectric function that varies spatially (e.g., a photonic lattice) have been described in, for example, U.S. Pat. No. 6,831,302 B2, entitled "Light Emitting Devices with Improved Extraction Efficiency," filed on Nov. 26, 2003, which is herein incorporated by reference in its entirety. A high extraction efficiency for an LED implies a high power of the emitted light and hence high brightness which may be desirable in various optical systems.

It should also be understood that other patterns are also possible, including a pattern that conforms to a transformation of a precursor pattern according to a mathematical function, including, but not limited to an angular displacement transformation. The pattern may also include a portion of a transformed pattern, including, but not limited to, a pattern that conforms to an angular displacement transformation. The pattern can also include regions having patterns that are related to each other by a rotation. A variety of such patterns are described in U.S. patent application Ser. No. 11/370,220, entitled "Patterned Devices and Related Methods," filed on Mar. 7, 2006, which is herein incorporated by reference in its entirety.

Light may be generated by the LED as follows. The p-side contact layer can be held at a positive potential relative to the n-side contact pad, which causes electrical current to be injected into the LED. As the electrical current passes through the active region, electrons from n-doped layer(s) can combine in the active region with holes from p-doped layer(s), which can cause the active region to generate light. The active region can contain a multitude of point dipole radiation sources that generate light with a spectrum of wavelengths characteristic of the material from which the active region is formed. For InGaN/GaN quantum wells, the spectrum of wavelengths of light generated by the light-generating region can have a peak wavelength of about 445 nanometers (nm) and a full width at half maximum (FWHM) of about 30 nm, which is perceived by human eyes as blue light. The light emitted by the LED may be influenced by any patterned interface through which light passes, whereby the pattern can be arranged so as to influence light extraction and/or collimation.

In other embodiments, the active region can generate light having a peak wavelength corresponding to ultraviolet light (e.g., having a peak wavelength of about 370-390 nm), violet light (e.g., having a peak wavelength of about 390-430 nm), blue light (e.g., having a peak wavelength of about 430-480 nm), cyan light (e.g., having a peak wavelength of about 480-500 nm), green light (e.g., having a peak wavelength of about 500 to 550 nm), yellow-green (e.g., having a peak wavelength of about 550-575 nm), yellow light (e.g., having a peak wavelength of about 575-595 nm), amber light (e.g., having a peak wavelength of about 595-605 nm), orange light (e.g., having a peak wavelength of about 605-620 nm), red light (e.g., having a peak wavelength of about 620-700 nm), and/or infrared light (e.g., having a peak wavelength of about 700-1200 nm).

In certain embodiments, the LED may emit light having a high power. As previously described, the high power of emitted light may be a result of a pattern that influences the light extraction efficiency of the LED. For example, the light emitted by the LED may have a total power greater than 0.5 Watts (e.g., greater than 1 Watt, greater than 5 Watts, or greater than 10 Watts). In some embodiments, the light generated has a total power of less than 100 Watts, though this should not be construed as a limitation of all embodiments. The total power of the light emitted from an LED can be measured by using an integrating sphere equipped with spectrometer, for example a SLM12 from Sphere Optics Lab Systems. The desired power depends, in part, on the optical system that the LED is being utilized within. For example, a display system (e.g., a LCD system) may benefit from the incorporation of high brightness LEDs which can reduce the total number of LEDs that are used to illuminate the display system.

The light generated by the LED may also have a high total power flux. As used herein, the term "total power flux" refers to the total power divided by the emission area. In some embodiments, the total power flux is greater than 0.03 Watts/$mm^2$, greater than 0.05 Watts/$mm^2$, greater than 0.1 Watts/$mm^2$, or greater than 0.2 Watts/$mm^2$. However, it should be understood that the LEDs used in systems and methods presented herein are not limited to the above-described power and power flux values.

In some embodiments, the LED may be associated with a wavelength-converting region. The wavelength-converting region may be, for example, a phosphor region and/or a region including quantum dots. The wavelength-converting region can be disposed over (e.g., in contact with) the emission surface 238. The wavelength-converting region can absorb light emitted by the light-generating region of the LED and emit light having a different wavelength than that absorbed. In this manner, LEDs can emit light of wavelength(s) (and, thus, color) that may not be readily obtainable from LEDs that do not include wavelength-converting regions. Examples of LEDs with wavelength-converting regions are described in, for example, U.S. Pat. No. 7,196,354, entitled "Wavelength-converting Light Emitting Devices," filed on Sep. 29, 2005, which is herein incorporated by reference in its entirety.

As used herein, an LED may be an LED die, a partially packaged LED die, or a fully packaged LED die. It should be understood that an LED may include two or more LED dies associated with one another, for example a red-light emitting LED die, a green-light emitting LED die, a blue-light emitting LED die, a cyan-light emitting LED die, or a yellow-light emitting LED die. For example, the two or more associated LED dies may be mounted on a common package. The two or more LED dies may be associated such that their respective light emissions may be combined to produce a desired spectral emission. The two or more LED dies may also be electrically associated with one another (e.g., connected to a common ground).

As used herein, when a structure (e.g., layer, region) is referred to as being "on", "over" "overlying" or "supported by" another structure, it can be directly on the structure, or an intervening structure (e.g., layer, region) also may be present. A structure that is "directly on" or "in contact with" another structure means that no intervening structure is present.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A light emitting component comprising:
   a substrate;
   a light emitting device formed of a semiconductor material supported by the substrate, wherein the light-emitting device has first and second terminals; and
   a switching element supported by the substrate and having first and second terminals electrically connected to the first and second terminals of the light-emitting device, respectively, and wherein the switching element is configured to, at least in part, divert at least some current away from the light emitting device when the switching element is in a closed state,
   wherein the light emitting component is configured such that a rise and fall time of the current flowing through the light emitting device is less than 5 times the switching time of the switching element, and
   wherein the light emitting component is configured such that a current flowing through the light emitting device is greater than 1 Amp when the switching element is in an open state.

2. The component of claim 1, wherein the light emitting component is configured such that a rise and fall time of the current flowing through the light emitting device is less than 300 nanoseconds.

3. The component of claim 1, wherein the light emitting component is configured such that a rise and fall time of the current flowing through the light emitting device is less than 200 nanoseconds.

4. The component of claim 1, wherein the light emitting component is configured such that a rise and fall time of the current flowing through the light emitting device is less than 100 nanoseconds.

5. The component of claim 1, wherein the light emitting component is configured such that a rise and fall time of the current flowing through the light emitting device is less than 3 times the switching time of the switching element.

6. The component of claim 1, wherein the light emitting component is configured such that a rise and fall time of the current flowing through the light emitting device is less than 2 times the switching time of the switching element.

7. The component of claim 1, wherein the light emitting component is configured such that a current flowing through the light emitting device is greater than 2 Amps when the switching element is in an open state.

8. The component of claim 1, wherein the light emitting component is configured such that a current flowing through the light emitting device is greater than 5 Amps when the switching element is in an open state.

9. The component of claim 1, wherein the substrate comprises an electrically conductive base substrate.

10. The component of claim 9, wherein the second terminal of the light emitting device and the second terminal of the switching element are electrically connected to the electrically conductive base substrate.

11. The component of claim 10, wherein the second terminal of the light emitting device is an anode terminal and the first terminal of the light-emitting device is a cathode terminal.

12. The component of claim 9, wherein the electrically conductive base substrate is configured to be electrically grounded.

13. The component of claim 9, wherein the electrically conductive base substrate is thermally conductive.

14. The component of claim 9, wherein the electrically conductive base substrate comprises a metal.

15. The component of claim 9, wherein the electrically conductive base substrate comprises a semiconductor.

16. The component of claim 9, wherein the electrically conductive base substrate comprises a thermal management system.

17. The component of claim 16, wherein the thermal management system comprises at least one heat pipe or at least one vapor plate.

18. The component of claim 1, wherein an electrical connection between the first terminal of the switching element and the first terminal of the light emitting device has a length of less than 5 cm.

19. The component of claim 1, wherein an electrical connection between the first terminal of the switching element and the first terminal of the light emitting device has a length of less than 2 cm.

20. The component of claim 1, wherein an electrical connection between the first terminal of the switching element and the first terminal of the light emitting device has a length of less than 1 cm.

21. The component of claim 1, wherein an electrical connection between the first terminal of the switching element and the first terminal of the light emitting device has a length of less than 5 mm.

22. The component of claim 1, wherein an electrical connection between the first terminal of the switching element and the first terminal of the light emitting device has a length of less than 1 mm.

23. The component of claim 1, wherein the switching element comprises at least one transistor.

24. The component of claim 23, wherein the at least one transistor comprises a bipolar junction transistor.

25. The component of claim 1, wherein the light emitting device comprises a light emitting diode.

26. The component of claim 1, wherein the light emitting device and the switching element are monolithically integrated.

27. The component of claim 1, wherein the switching element is monolithically integrated with the substrate.

28. The component of claim 1, wherein the light emitting device and the switching element are disposed over greater than 50% of the substrate.

29. A light emitting component, comprising:
   a substrate comprising an electrically conductive base substrate;
   a light emitting device formed of a semiconductor material supported by the substrate, wherein the light emitting device has first and second terminals; and
   a switching element supported by the substrate and having first and second terminals electrically connected to the first and second terminals of the light emitting device, respectively, and wherein the switching element is configured to, at least in part, divert at least some current away from the light emitting device when the switching element is in a closed state,
   wherein the light emitting component is configured such that a rise and fall time of the current flowing through the light emitting device is less than 5 times the switching time of the switching element, and
   wherein the substrate further comprises an electrically insulating layer disposed over at least a portion of the electrically conductive base substrate.

30. The component of claim 29, wherein the substrate further comprises electrically conductive lines disposed over at least a portion of the electrically insulating layer.

31. The component of claim 30, wherein at least some of the electrically conductive lines provide for electrical connection between the first terminal of the switching element and the first terminal of the light emitting device.

32. The component of claim 29, wherein the light emitting device comprises a light emitting diode.

33. The component of claim 29, wherein the light emitting device and the switching element are monolithically integrated.

34. The component of claim 29, wherein the switching element is monolithically integrated with the substrate.

35. A light emitting component, comprising:
   a substrate;
   a light emitting device formed of a semiconductor material supported by the substrate, wherein the light emitting device has first and second terminals; and
   a switching element supported by the substrate and having first and second terminals electrically connected to the first and second terminals of the light emitting device, respectively, and wherein the switching element is configured to, at least in part, divert at least some current away from the light emitting device when the switching element is in a closed state,
   wherein the light emitting component is configured such that a rise and fall time of the current flowing through the light emitting device is less than 5 times the switching time of the switching element, and
   wherein the switching element comprises at least one field-effect transistor.

36. The component of claim 35, wherein the field-effect transistor comprises a vertical field-effect transistor.

37. The component of claim 35, wherein the light emitting device comprises a light emitting diode.

38. The component of claim 35, wherein the light emitting device and the switching element are monolithically integrated.

39. The component of claim 35, wherein the switching element is monolithically integrated with the substrate.

40. A light emitting component, comprising:
   a substrate;
   a light emitting device formed of a semiconductor material supported by the substrate, wherein the light emitting device has first and second terminals; and
   a switching element supported by the substrate and having first and second terminals electrically connected to the first and second terminals of the light emitting device, respectively, and wherein the switching element is configured to, at least in part, divert at least some current away from the light emitting device when the switching element is in a closed state,
   wherein the light emitting component is configured such that a rise and fall time of the current flowing through the light emitting device is less than 5 times the switching time of the switching element,
   wherein the switching element is monolithically integrated with the substrate, and
   wherein the light emitting device is monolithically integrated with the substrate.

41. The component of claim 40, wherein the light emitting device comprises a light emitting diode.

* * * * *